(12) United States Patent
Xu et al.

(10) Patent No.: US 12,355,841 B2
(45) Date of Patent: Jul. 8, 2025

(54) ADAPTATION FOR EXTENDED REALITY TRANSMISSIONS

(71) Applicant: QUALCOMM Incorporated, San Diego, CA (US)

(72) Inventors: Huilin Xu, Temecula, CA (US); Yuchul Kim, San Diego, CA (US); Liangping Ma, San Diego, CA (US); Yeliz Tokgoz, San Diego, CA (US); Nicolas Cornillet, Lannion (FR)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 17/724,224

(22) Filed: Apr. 19, 2022

(65) Prior Publication Data
US 2023/0336628 A1 Oct. 19, 2023

(51) Int. Cl.
| H04L 1/16 | (2023.01) |
| H04L 1/1607 | (2023.01) |
| H04L 1/1812 | (2023.01) |
| H04L 67/131 | (2022.01) |
| H04W 72/23 | (2023.01) |

(52) U.S. Cl.
CPC .......... H04L 67/131 (2022.05); H04L 1/1671 (2013.01); H04L 1/1819 (2013.01); H04W 72/23 (2023.01)

(58) Field of Classification Search
CPC .... H04L 1/1671; H04L 1/1887; H04L 1/1896
See application file for complete search history.

(56) References Cited

U.S. PATENT DOCUMENTS

| 2017/0134124 A1* | 5/2017 | Lee ........................ H04W 72/23 |
| 2018/0199359 A1* | 7/2018 | Cao ........................ H04L 5/0096 |
| 2019/0289478 A1* | 9/2019 | Hosseini ................. H04L 1/187 |
| 2019/0349116 A1* | 11/2019 | Hosseini ............... H04L 1/0011 |
| 2021/0243731 A1* | 8/2021 | Shin ....................... H04L 5/0094 |
| 2023/0403702 A1* | 12/2023 | Su .......................... H04L 1/1896 |

OTHER PUBLICATIONS

PUSCH enhancements for NR URLLC by ZTE (Year: 2019).*

* cited by examiner

*Primary Examiner* — Pamit Kaur
(74) *Attorney, Agent, or Firm* — Holland & Hart LLP

(57) ABSTRACT

Methods, systems, and devices for wireless communications are described. Described techniques provide for dynamic configuration of feedback, repetition, and/or modulation and coding scheme(s) for transmissions within an application data unit (ADU). A user equipment (UE) and a network entity may communicate control signaling indicating transmission configurations for a set of multiple time domain durations within an ADU and a start of a first time domain duration. The transmission configurations may indicate a number of repetitions for each transmission. In some cases, the network entity may transmit control signaling that separately configures a number of repetitions for each feedback process of a set of multiple feedback processes associated with an ADU and indicates whether repetition is enabled for each feedback process and a redundancy version identifier sequence for repetitions for each feedback process. The UE and the network entity may communicate transmissions within the ADU in accordance with the control signaling.

30 Claims, 20 Drawing Sheets

ADAPTATION FOR EXTENDED REALITY TRANSMISSIONS

FIELD OF TECHNOLOGY

The following relates to wireless communications, including adaptation for extended reality transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support adaptation for extended reality transmissions. For example, the described techniques provide for dynamic configuration of hybrid automatic repeat request (HARQ) feedback, repetition, and/or modulation and coding scheme(s) (MCS) for transmissions within an application data unit (ADU). A user equipment (UE) and a network entity may communicate control signaling indicating a set of multiple transmission configurations for a set of multiple time domain durations within an ADU and a start of a first time domain duration of the set of multiple time domain durations. In some cases, the set of multiple transmission configuration may indicate a number of repetitions for each transmission within the ADU. In some cases, a number of repetitions for a transmission configuration may be zero (e.g., repetition is deactivated). The UE and the network entity may communicate a first subset of the transmissions within the ADU during the first time domain duration in accordance with a first transmission configuration of the set of multiple transmission configurations, and the UE and the network entity may communicate a second subset of the transmissions within the ADU during the second time domain duration in accordance with a second transmission configuration of the set of multiple transmission configurations.

In some cases, the network entity may transmit control signaling to the UE that separately configures a number of repetitions for each HARQ process of a set of multiple HARQ processes associated with an ADU. The control signaling may indicate whether repetition is enabled for each HARQ process of the set of multiple HARQ processes. The control signaling may indicate a redundancy version identifier (RVID) sequence for repetitions for each HARQ process of the set of multiple HARQ processes. The UE and the network entity may communicate transmissions within an ADU in accordance with the control signaling. For example, the UE and the network entity may communicate a first transmission within the ADU in accordance with a first HARQ process and the associated number of repetitions and communicate a second transmission within the ADU in accordance with a second HARQ process and the associated number of repetitions.

A method for wireless communications at a UE is described. The method may include communicating control signaling indicating a set of multiple transmission configurations for a set of multiple time domain durations within an ADU and a start of a first time domain duration of the set of multiple time domain durations, the set of multiple transmission configurations indicating a respective number of repetitions for each transmission of a set of multiple transmissions within the ADU, communicating, with a network entity during the first time domain duration, a first subset of the set of multiple transmissions within the ADU in accordance with a first transmission configuration of the set of multiple transmission configurations, and communicating, with the network entity during a second time domain duration of the set of multiple time domain durations, a second subset of the set of multiple transmissions within the ADU in accordance with a second transmission configuration of the set of multiple transmission configurations.

An apparatus for wireless communications at a UE is described. The apparatus may include a processor, memory coupled with the processor, and instructions stored in the memory. The instructions may be executable by the processor to cause the apparatus to communicate control signaling indicating a set of multiple transmission configurations for a set of multiple time domain durations within an ADU and a start of a first time domain duration of the set of multiple time domain durations, the set of multiple transmission configurations indicating a respective number of repetitions for each transmission of a set of multiple transmissions within the ADU, communicate, with a network entity during the first time domain duration, a first subset of the set of multiple transmissions within the ADU in accordance with a first transmission configuration of the set of multiple transmission configurations, and communicate, with the network entity during a second time domain duration of the set of multiple time domain durations, a second subset of the set of multiple transmissions within the ADU in accordance with a second transmission configuration of the set of multiple transmission configurations.

Another apparatus for wireless communications at a UE is described. The apparatus may include means for communicating control signaling indicating a set of multiple transmission configurations for a set of multiple time domain durations within an ADU and a start of a first time domain duration of the set of multiple time domain durations, the set of multiple transmission configurations indicating a respective number of repetitions for each transmission of a set of multiple transmissions within the ADU, means for communicating, with a network entity during the first time domain duration, a first subset of the set of multiple transmissions within the ADU in accordance with a first transmission configuration of the set of multiple transmission configurations, and means for communicating, with the network entity during a second time domain duration of the set of multiple time domain durations, a second subset of the set of multiple transmissions within the ADU in accordance with a second transmission configuration of the set of multiple transmission configurations.

A non-transitory computer-readable medium storing code for wireless communications at a UE is described. The code may include instructions executable by a processor to communicate control signaling indicating a set of multiple transmission configurations for a set of multiple time domain durations within an ADU and a start of a first time domain duration of the set of multiple time domain durations, the set of multiple transmission configurations indicating a respective number of repetitions for each transmission of a set of multiple transmissions within the ADU, communicate, with a network entity during the first time domain duration, a first subset of the set of multiple transmissions within the ADU in accordance with a first transmission configuration of the set of multiple transmission configurations, and communicate, with the network entity during a second time domain duration of the set of multiple time domain durations, a second subset of the set of multiple transmissions within the ADU in accordance with a second transmission configuration of the set of multiple transmission configurations.

In some examples of the method, apparatuses, and non-transitory computer-readable medium described herein, communicating the control signaling may include operations, features, means, or instructions for receiving a downlink control information (DCI) message scheduling the set of multiple transmissions within the ADU.

In some examples of the method, apparatuses, and non-transitory computer-readable medium described herein, communicating the control signaling may include operations, features, means, or instructions for communicating a first control message indicating the set of multiple transmission configurations for the set of multiple time domain durations and communicating a second control message indicating the start of the first time domain duration.

In some examples of the method, apparatuses, and non-transitory computer-readable medium described herein, communicating the control signaling may include operations, features, means, or instructions for communicating a third control message indicating a start of the second time domain duration.

In some examples of the method, apparatuses, and non-transitory computer-readable medium described herein, communicating the control signaling may include operations, features, means, or instructions for communicating the control signaling indicating one or more parameters associated with each transmission configuration, the one or more parameters including activation or deactivation of retransmission based on HARQ, an MCS, or both.

In some examples of the method, apparatuses, and non-transitory computer-readable medium described herein, communicating the control signaling may include operations, features, means, or instructions for receiving a wake-up signal, where a timing of the start of the first time domain duration of the set of multiple time domain durations may be based on the wake-up signal.

In some examples of the method, apparatuses, and non-transitory computer-readable medium described herein, communicating the control signaling may include operations, features, means, or instructions for communicating the control signaling indicating a respective timer associated with each time domain duration of the set of multiple time domain durations, where a number of transmissions within each time domain duration of the set of multiple time domain durations may be based on the respective timer associated with each time domain duration of the set of multiple time domain durations.

In some examples of the method, apparatuses, and non-transitory computer-readable medium described herein, communicating the control signaling may include operations, features, means, or instructions for communicating the control signaling indicating a number of slots associated with each time domain duration of the set of multiple time domain durations.

In some examples of the method, apparatuses, and non-transitory computer-readable medium described herein, the UE does not expect a second transmission of the set of multiple transmissions within the ADU with repetition activated prior to a first transmission of the set of multiple transmissions within the ADU with repetition deactivated.

In some examples of the method, apparatuses, and non-transitory computer-readable medium described herein, the UE does not expect a second transmission of the set of multiple transmissions within the ADU with HARQ deactivated prior to a first transmission of the set of multiple transmissions within the ADU with HARQ activated.

In some examples of the method, apparatuses, and non-transitory computer-readable medium described herein, the UE does not expect a second transmission of the set of multiple transmissions within the ADU with a first MCS prior to a first transmission of the set of multiple transmissions within the ADU with a second MCS higher than the first MCS.

In some examples of the method, apparatuses, and non-transitory computer-readable medium described herein, communicating the control signaling may include operations, features, means, or instructions for communicating the control signaling indicating, for each transmission of the set of multiple transmissions, a respective HARQ identifier and one or more parameters associated with the respective transmission, the one or more parameters including a number of repetitions, an MCS value, or both.

In some examples of the method, apparatuses, and non-transitory computer-readable medium described herein, a first number of transmissions of the first subset of the set of multiple transmissions may be less than a second number of transmissions of the second subset of the set of multiple transmissions.

A method for wireless communications at a network entity is described. The method may include communicating control signaling indicating a set of multiple transmission configurations for a set of multiple time domain durations within an ADU and a start of a first time domain duration of the set of multiple time domain durations, the set of multiple transmission configurations indicating a respective number of repetitions for each transmission of a set of multiple transmissions within the ADU, communicating, with a UE during the first time domain duration, a first subset of the set of multiple transmissions within the ADU in accordance with a first transmission configuration of the set of multiple transmission configurations, and communicating, with the UE during a second time domain duration of the set of multiple time domain durations, a second subset of the set of multiple transmissions within the ADU in accordance with a second transmission configuration of the set of multiple transmission configurations.

An apparatus for wireless communications at a network entity is described. The apparatus may include a processor, memory coupled with the processor, and instructions stored in the memory. The instructions may be executable by the processor to cause the apparatus to communicate control signaling indicating a set of multiple transmission configurations for a set of multiple time domain durations within an ADU and a start of a first time domain duration of the set of multiple time domain durations, the set of multiple transmission configurations indicating a respective number of repetitions for each transmission of a set of multiple transmissions within the ADU, communicate, with a UE during the first time domain duration, a first subset of the set of multiple transmissions within the ADU in accordance with a first transmission configuration of the set of multiple transmission configurations, and communicate, with the UE during a second time domain duration of the set of multiple time domain durations, a second subset of the set of multiple transmissions within the ADU in accordance with a second transmission configuration of the set of multiple transmission configurations.

Another apparatus for wireless communications at a network entity is described. The apparatus may include means for communicating control signaling indicating a set of multiple transmission configurations for a set of multiple time domain durations within an ADU and a start of a first time domain duration of the set of multiple time domain durations, the set of multiple transmission configurations indicating a respective number of repetitions for each transmission of a set of multiple transmissions within the ADU, means for communicating, with a UE during the first time domain duration, a first subset of the set of multiple transmissions within the ADU in accordance with a first transmission configuration of the set of multiple transmission configurations, and means for communicating, with the UE during a second time domain duration of the set of multiple time domain durations, a second subset of the set of multiple transmissions within the ADU in accordance with a second transmission configuration of the set of multiple transmission configurations.

A non-transitory computer-readable medium storing code for wireless communications at a network entity is described. The code may include instructions executable by a processor to communicate control signaling indicating a set of multiple transmission configurations for a set of multiple time domain durations within an ADU and a start of a first time domain duration of the set of multiple time domain durations, the set of multiple transmission configurations indicating a respective number of repetitions for each transmission of a set of multiple transmissions within the ADU, communicate, with a UE during the first time domain duration, a first subset of the set of multiple transmissions within the ADU in accordance with a first transmission configuration of the set of multiple transmission configurations, and communicate, with the UE during a second time domain duration of the set of multiple time domain durations, a second subset of the set of multiple transmissions within the ADU in accordance with a second transmission configuration of the set of multiple transmission configurations.

In some examples of the method, apparatuses, and non-transitory computer-readable medium described herein, communicating the control signaling may include operations, features, means, or instructions for transmitting a DCI message scheduling the set of multiple transmissions within the ADU.

In some examples of the method, apparatuses, and non-transitory computer-readable medium described herein, communicating the control signaling may include operations, features, means, or instructions for communicating a first control message indicating the set of multiple transmission configurations for the set of multiple time domain durations and communicating a second control message indicating the start of the first time domain duration.

In some examples of the method, apparatuses, and non-transitory computer-readable medium described herein, communicating the control signaling may include operations, features, means, or instructions for communicating a third control message indicating a start of the second time domain duration.

In some examples of the method, apparatuses, and non-transitory computer-readable medium described herein, communicating the control signaling may include operations, features, means, or instructions for communicating the control signaling indicating one or more parameters associated with each transmission configuration, the one or more parameters including activation or deactivation of retransmission based on HARQ, an MCS, or both.

In some examples of the method, apparatuses, and non-transitory computer-readable medium described herein, communicating the control signaling may include operations, features, means, or instructions for transmitting a wake-up signal, where a timing of the start of the first time domain duration of the set of multiple time domain durations may be based on the wake-up signal.

In some examples of the method, apparatuses, and non-transitory computer-readable medium described herein, communicating the control signaling may include operations, features, means, or instructions for communicating the control signaling indicating a respective timer associated with each time domain duration of the set of multiple time domain durations, where a number of transmissions within each time domain duration of the set of multiple time domain durations may be based on the respective timer associated with each time domain duration of the set of multiple time domain durations.

In some examples of the method, apparatuses, and non-transitory computer-readable medium described herein, communicating the control signaling may include operations, features, means, or instructions for communicating the control signaling indicating a number of slots associated with each time domain duration of the set of multiple time domain durations.

In some examples of the method, apparatuses, and non-transitory computer-readable medium described herein, communicating the control signaling may include operations, features, means, or instructions for communicating the control signaling indicating, for each transmission of the set of multiple transmissions, a respective HARQ identifier and one or more parameters associated with the respective transmission, the one or more parameters including a number of repetitions, an MCS value, or both.

In some examples of the method, apparatuses, and non-transitory computer-readable medium described herein, a first number of transmissions of the first subset of the set of multiple transmissions may be less than a second number of transmissions of the second subset of the set of multiple transmissions.

A method for wireless communications at a UE is described. The method may include receiving control signaling that separately configures a number of repetitions for each feedback process of a set of multiple feedback processes associated with an ADU, the control signaling indicating whether repetition is enabled for each feedback process of the set of multiple feedback processes, and indicating a redundancy version identifier sequence for repetitions for each feedback process of the set of multiple feedback processes and communicating, with a network entity, a set of multiple transmissions within the ADU in accordance with the control signaling.

An apparatus for wireless communications at a UE is described. The apparatus may include a processor, memory coupled with the processor, and instructions stored in the memory. The instructions may be executable by the processor to cause the apparatus to receive control signaling that separately configures a number of repetitions for each feedback process of a set of multiple feedback processes associated with an ADU, the control signaling indicating whether repetition is enabled for each feedback process of the set of multiple feedback processes, and indicating a redundancy version identifier sequence for repetitions for each feedback process of the set of multiple feedback processes and communicate, with a network entity, a set of multiple transmissions within the ADU in accordance with the control signaling.

Another apparatus for wireless communications at a UE is described. The apparatus may include means for receiving control signaling that separately configures a number of repetitions for each feedback process of a set of multiple feedback processes associated with an ADU, the control signaling indicating whether repetition is enabled for each feedback process of the set of multiple feedback processes, and indicating a redundancy version identifier sequence for repetitions for each feedback process of the set of multiple feedback processes and means for communicating, with a network entity, a set of multiple transmissions within the ADU in accordance with the control signaling.

A non-transitory computer-readable medium storing code for wireless communications at a UE is described. The code may include instructions executable by a processor to receive control signaling that separately configures a number of repetitions for each feedback process of a set of multiple feedback processes associated with an ADU, the control signaling indicating whether repetition is enabled for each feedback process of the set of multiple feedback processes, and indicating a redundancy version identifier sequence for repetitions for each feedback process of the set of multiple feedback processes and communicate, with a network entity, a set of multiple transmissions within the ADU in accordance with the control signaling.

In some examples of the method, apparatuses, and non-transitory computer-readable medium described herein, a respective transmission of the set of multiple transmissions may be associated with a respective feedback process of the set of multiple feedback processes.

In some examples of the method, apparatuses, and non-transitory computer-readable medium described herein, communicating the set of multiple transmissions may include operations, features, means, or instructions for communicating a first transmission of the set of multiple transmissions and a repetition of the first transmission within the ADU in accordance with a respective redundancy version identifier sequence for repetitions associated with a first feedback process of the set of multiple feedback processes indicating that repetition may be enabled.

In some examples of the method, apparatuses, and non-transitory computer-readable medium described herein, communicating the set of multiple transmissions may include operations, features, means, or instructions for communicating a first transmission of the set of multiple transmissions within the ADU in accordance with a respective redundancy version identifier sequence for repetitions associated with a first feedback process of the set of multiple feedback processes indicating that repetition may be disabled, where a repetition of the first transmission may be not transmitted within the ADU.

In some examples of the method, apparatuses, and non-transitory computer-readable medium described herein, receiving the control signaling may include operations, features, means, or instructions for receiving the control signaling via one of a DCI message or a medium access control (MAC) control element.

In some examples of the method, apparatuses, and non-transitory computer-readable medium described herein, receiving the control signaling may include operations, features, means, or instructions for receiving an indication of a respective MCS associated with each feedback process of the set of multiple feedback processes.

A method for wireless communications at a network entity is described. The method may include transmitting control signaling that separately configures a number of repetitions for each feedback process of a set of multiple feedback processes associated with an ADU, the control signaling indicating whether repetition is enabled for each feedback process of the set of multiple feedback processes, and indicating a redundancy version identifier sequence for repetitions for each feedback process of the set of multiple feedback processes and communicating, with a UE, a set of multiple transmissions within the ADU in accordance with the control signaling.

An apparatus for wireless communications at a network entity is described. The apparatus may include a processor, memory coupled with the processor, and instructions stored in the memory. The instructions may be executable by the processor to cause the apparatus to transmit control signaling that separately configures a number of repetitions for each feedback process of a set of multiple feedback processes associated with an ADU, the control signaling indicating whether repetition is enabled for each feedback process of the set of multiple feedback processes, and indicating a redundancy version identifier sequence for repetitions for each feedback process of the set of multiple feedback processes and communicate, with a UE, a set of multiple transmissions within the ADU in accordance with the control signaling.

Another apparatus for wireless communications at a network entity is described. The apparatus may include means for transmitting control signaling that separately configures a number of repetitions for each feedback process of a set of multiple feedback processes associated with an ADU, the control signaling indicating whether repetition is enabled for each feedback process of the set of multiple feedback processes, and indicating a redundancy version identifier sequence for repetitions for each feedback process of the set of multiple feedback processes and means for communicating, with a UE, a set of multiple transmissions within the ADU in accordance with the control signaling.

A non-transitory computer-readable medium storing code for wireless communications at a network entity is described. The code may include instructions executable by a processor to transmit control signaling that separately configures a number of repetitions for each feedback process of a set of multiple feedback processes associated with an ADU, the control signaling indicating whether repetition is enabled for each feedback process of the set of multiple feedback processes, and indicating a redundancy version identifier sequence for repetitions for each feedback process of the set of multiple feedback processes and communicate, with a UE, a set of multiple transmissions within the ADU in accordance with the control signaling.

In some examples of the method, apparatuses, and non-transitory computer-readable medium described herein, a respective transmission of the set of multiple transmissions may be associated with a respective feedback process of the set of multiple feedback processes.

In some examples of the method, apparatuses, and non-transitory computer-readable medium described herein, communicating the set of multiple transmissions may include operations, features, means, or instructions for communicating a first transmission of the set of multiple transmissions and a repetition of the first transmission within the ADU in accordance with a respective redundancy version identifier sequence for repetitions associated with a first feedback process of the set of multiple feedback processes indicating that repetition may be enabled.

In some examples of the method, apparatuses, and non-transitory computer-readable medium described herein, communicating the set of multiple transmissions may include operations, features, means, or instructions for communicating a first transmission of the set of multiple transmissions within the ADU in accordance with a respective redundancy version identifier sequence for repetitions associated with a first feedback process of the set of multiple feedback processes indicating that repetition may be disabled, where a repetition of the first transmission may be not transmitted within the ADU.

In some examples of the method, apparatuses, and non-transitory computer-readable medium described herein, transmitting the control signaling may include operations, features, means, or instructions for transmitting the control signaling via one of a DCI message or a medium access control (MAC) control element.

In some examples of the method, apparatuses, and non-transitory computer-readable medium described herein, transmitting the control signaling may include operations, features, means, or instructions for transmitting an indication of a respective MCS associated with each feedback process of the set of multiple feedback processes.

DETAILED DESCRIPTION

Figure 1:
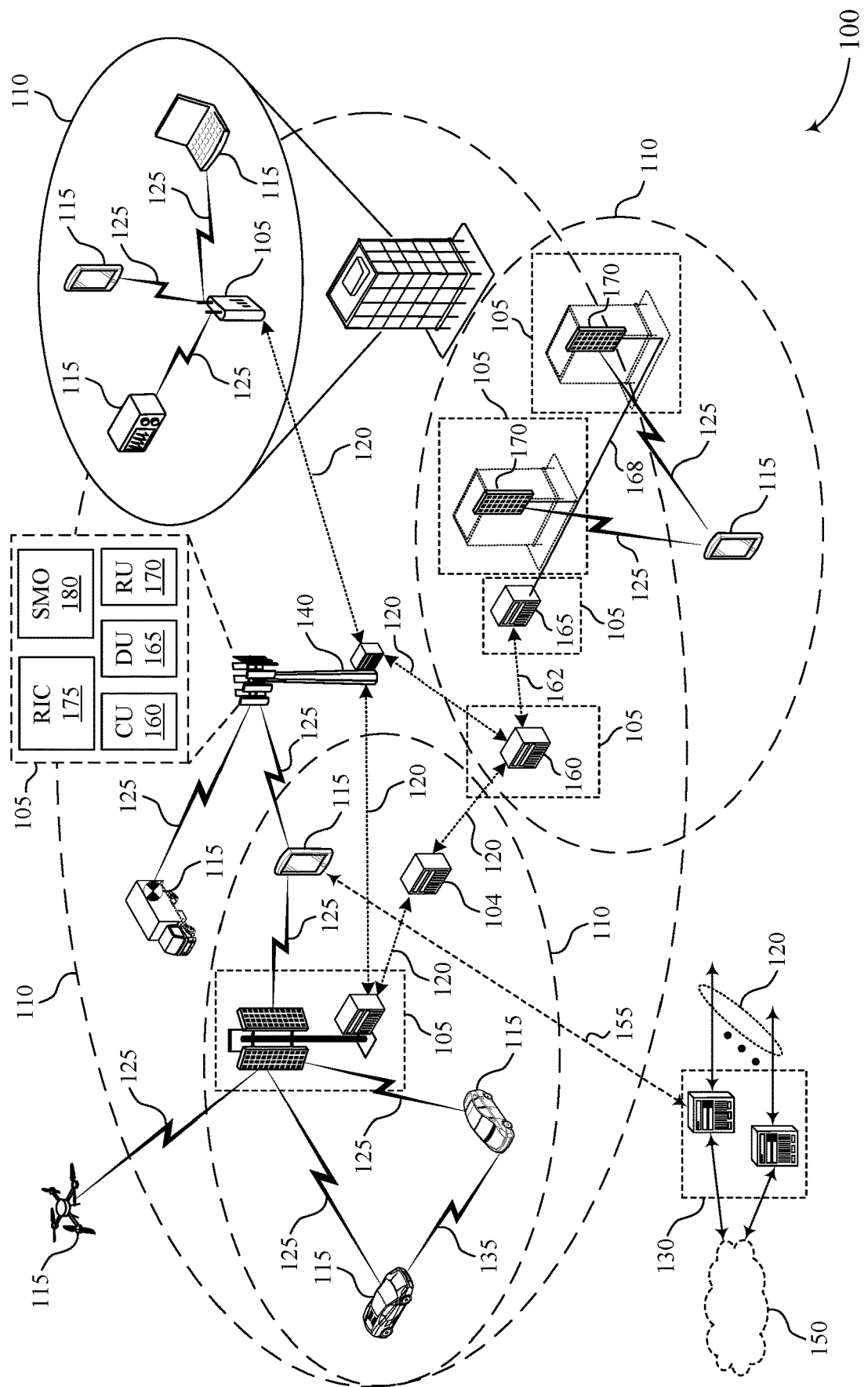
FIG. 1 illustrates an example of a wireless communications system that supports adaptation for extended reality transmissions in accordance with one or more aspects of the present disclosure.

Extended reality (XR) traffic in a wireless communications system may include virtual reality traffic, augmented reality traffic, and the like, which may demand high reliability and low latency transmissions. For example, a network entity may transmit video frames to XR users (e.g., user equipments (UEs)) or a UE may transmit video frames to a network entity. A defined (e.g., minimum) amount of data an application software may process at a time (e.g., the granularity of data processed by an application software) may be referred to as an application data unit (ADU). An ADU may correspond to a period of time and may include multiple data packet transmissions (e.g., physical downlink shared channel (PDSCH) transmissions for downlink or physical uplink shared channel (PUSCH) transmissions for uplink). In XR, data may be transmitted in data bursts, which may contain one or multiple ADUs. A receiving device may successfully receive an entire ADU or data burst (e.g., all of the data packets for the ADU or data burst) before application software at the receiving device can play the video frame associated with the ADU or data burst. Accordingly, earlier transmitted data packets for an ADU or data burst may have a larger delay margin than later transmitted data packets for an ADU or data burst. Earlier data packet transmissions may have a sufficient delay margin for hybrid automatic repeat request (HARQ) negative acknowledgment and subsequent retransmission, while in some cases, later packets may be blindly retransmitted. Which transmissions of an ADU or data burst are enabled with HARQ feedback and which transmissions are blindly repeated may be configured in radio resource control (RRC). RRC configuration, however, may not enable dynamic configuration of HARQ feedback, repetition for transmissions within an ADU, or a modulation and coding scheme (MCS) for transmissions within an ADU. Accordingly, RRC configuration of HARQ feedback, repetition, and/or MCS for transmissions within an ADU may not account for changing channel conditions or changing network or UE power considerations.

The present disclosure relates to dynamic configuration of HARQ feedback, repetition, and/or MCS for transmissions within an ADU. A UE and a network entity may communicate control signaling indicating a set of multiple transmission configurations for a set of multiple time domain durations within an ADU and a start of a first time domain duration of the set of multiple time domain durations. In some cases, the set of multiple transmission configuration may indicate a number of repetitions for each transmission within the ADU. In some cases, a number of repetitions for a transmission configuration may be zero (e.g., repetition is deactivated). In some cases, the set of multiple transmission configuration may indicate one or more parameters associated with each transmission configuration. For example, the one or more parameters may include whether HARQ feedback is activated and/or an MCS. The UE and the network entity may communicate a first subset of the transmissions within the ADU during the first time domain duration in accordance with a first transmission configuration of the set of multiple transmission configurations, and the UE and the network entity may communicate a second subset of the transmissions within the ADU during the second time domain duration in accordance with a second transmission configuration of the set of multiple transmission configurations.

In some cases, the network entity may transmit control signaling to the UE that separately configures a number of repetitions for each HARQ process of a set of multiple HARQ processes associated with an ADU. The control signaling may indicate whether repetition is enabled for each HARQ process of the set of multiple HARQ processes. The control signaling may indicate a redundancy version identifier (RVID) sequence for repetitions for each HARQ process of the set of multiple HARQ processes. The UE and the network entity may communicate transmissions within an ADU in accordance with the control signaling. For example, the UE and the network entity may communicate a first transmission within the ADU in accordance with a first HARQ process and the associated number of repetitions and communicate a second transmission within the ADU in accordance with a second HARQ process and the associated number of repetitions.

Aspects of the disclosure are initially described in the context of wireless communications systems. Aspects of the disclosure are further illustrated by and described with reference to timing diagrams and process flows. Aspects of the disclosure are further illustrated by and described with reference to apparatus diagrams, system diagrams, and flowcharts that relate to adaptation for extended reality transmissions.

FIG. 1 illustrates an example of a wireless communications system 100 that supports adaptation for extended reality transmissions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support adaptation for extended reality transmissions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. HARQ feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some cases, the wireless communications system 100 may support XR communications. For example, a network entity 105 may transmit video frames to XR users (e.g., UEs 115) or a UE 115 may transmit video frames to a network entity. XR may be designed to save UE 115 power and improve user throughput, which may be achieved, for example, by reducing awake time, reducing blind detection of control information (e.g., physical downlink control channel (PDCCH)) and user data (e.g., PDSCH), or properly configuring physical layer parameters (e.g., MCS) to reduce Transmission latency.

In XR traffic, traffic may arrive in bursts. For example, a video frame (e.g., an ADU or a data burst) may be transmitted over multiple PDSCH or PUSCH packets. For example, an augmented reality or a virtual reality data rate may be 30 Megabits per second, which involves a mean packet size of 62500 bytes, a minimum packet size of 31250 bytes, and a maximum packet size of 93750 bytes (which respectfully involve 10, 5, and 15 slots for a 100 MHz bandwidth with 30 kHz subcarrier spacing at 16 quadrature amplitude modulation and 1/3 code rate). XR service may be delay sensitive. For example, a typical over the air packet delay budget (PDB) may be 10 ms to satisfy real time communication demands. Example XR user devices (e.g., XR UEs 115) include wireless mobile devices such as a head mounted display (HMD). Due to limited battery capacity, power saving designs may be important for positive user experience. Random data arrival time, which may be referred to as jitter, due to content dependent video compression algorithms and the network transmission time may complicate XR design.

In some cases, a receiving device may have to successfully receive an entire ADU or data burst (e.g., all of the data packets for the ADU or data burst) before application software at the receiving device can play the video frame associated with the ADU or data burst. A data burst may contain one or multiple ADUs. Due to limited bandwidth, UE 115 processing capability, and multiplexing of users, data packets may be sequentially delivered even when multiple carriers are used. Accordingly, earlier transmitted data packets of an ADU or a data burst may have a larger delay margin than data packets transmitted later in the ADU or a data burst. For example, a larger latency and higher packet error rate may be tolerated at the temporally beginning portion of an ADU or a data burst as compared to the temporally end portion of an ADU or a data burst. At the beginning portion of an ADU or a data burst, if a packet decoding error occurs, the receiving device may still request the transmitting device to send a retransmission based on a HARQ NACK feedback. For a packet approaching the end of the ADU or a data burst transmission, however, there may not be enough latency budget for the transmission of HARQ feedback from the receiver and the retransmission of the failed data packet from the XR data transmitter. Accordingly, packets of the same ADU or a data burst may have different configurations. For example, HARQ feedback and retransmission may be enabled at the beginning of an ADU or a data burst and disabled at the end of an ADU or a data burst.

Which transmissions of an ADU are enabled with HARQ feedback and which transmissions are blindly repeated may be configured in RRC (which may be specified for non-terrestrial networks). PDSCH repetition may be enabled for all dynamic grant (DG) scheduled PDSCH and PUSCH transmissions by RRC configuration, or per configured grant (CG) configuration for uplink or semi-persistent scheduling (SPS) configuration for downlink in consecutive slots. MCS may be dynamically configured by the scheduling downlink control information (DCI) in PDCCH for DG, the activation DCI for SPS and type 2 CG, and the RRC semi-static configuration for type 1 CG. In some cases, for the early packets of an ADU, HARQ acknowledgment (ACK) and negative acknowledgment (NACK) feedback may be enabled so that the XR transmitting device may send retransmissions of failed data packets. In some cases, for the late packets of an ADU, HARQ ACK/NACK feedback may be disabled and blind retransmission may be enabled so that remaining data may be successfully delivered without the risk of exceeding the delay budget by HARQ feedback based retransmissions. For dynamic grant based XR data transmission, a more dynamic indication of repetition for blind retransmission may be preferable (e.g., as compared to RRC configuration). Additionally, ADU data transmission scheduled or triggered by a single control signaling (e.g., a single DCI) may involve less control overhead, which translates to the highest power saving gain. The delay and throughput balanced design may also be considered.

A UE 115 and a network entity 105 may communicate control signaling indicating a set of multiple transmission configurations for a set of multiple time domain durations within an ADU and a start of a first time domain duration of the set of multiple time domain durations. In some cases, the set of multiple transmission configurations may indicate a number of repetitions for each transmission within the ADU. In some cases, a number of repetitions for a transmission configuration may be zero (e.g., repetition is deactivated). In some cases, the set of multiple transmission configurations may indicate one or more parameters associated with each transmission configuration. For example, the one or more parameters may include whether HARQ feedback is activated and/or an MCS. The UE 115 and the network entity 105 may communicate a first subset of the transmissions within the ADU during the first time domain duration in accordance with a first transmission configuration of the set of multiple transmission configurations, and the UE 115 and the network entity 105 may communicate a second subset of the transmissions within the ADU during the second time domain duration in accordance with a second transmission configuration of the set of multiple transmission configurations.

In some cases, the network entity 105 may transmit control signaling to the UE 115 that separately configures a number of repetitions for each HARQ process of a set of multiple HARQ processes associated with an ADU. The control signaling may indicate whether repetition is enabled for each HARQ process of the set of multiple HARQ processes. The control signaling may indicate a redundancy version identifier (RVID) sequence for repetitions for each HARQ process of the set of multiple HARQ processes. The UE 115 and the network entity 105 may communicate transmissions within an ADU in accordance with the control signaling. For example, the UE 115 and the network entity 105 may communicate a first transmission within the ADU in accordance with a first HARQ process and the associated number of repetitions and communicate a second transmission within the ADU in accordance with a second HARQ process and the associated number of repetitions.

Figure 2:
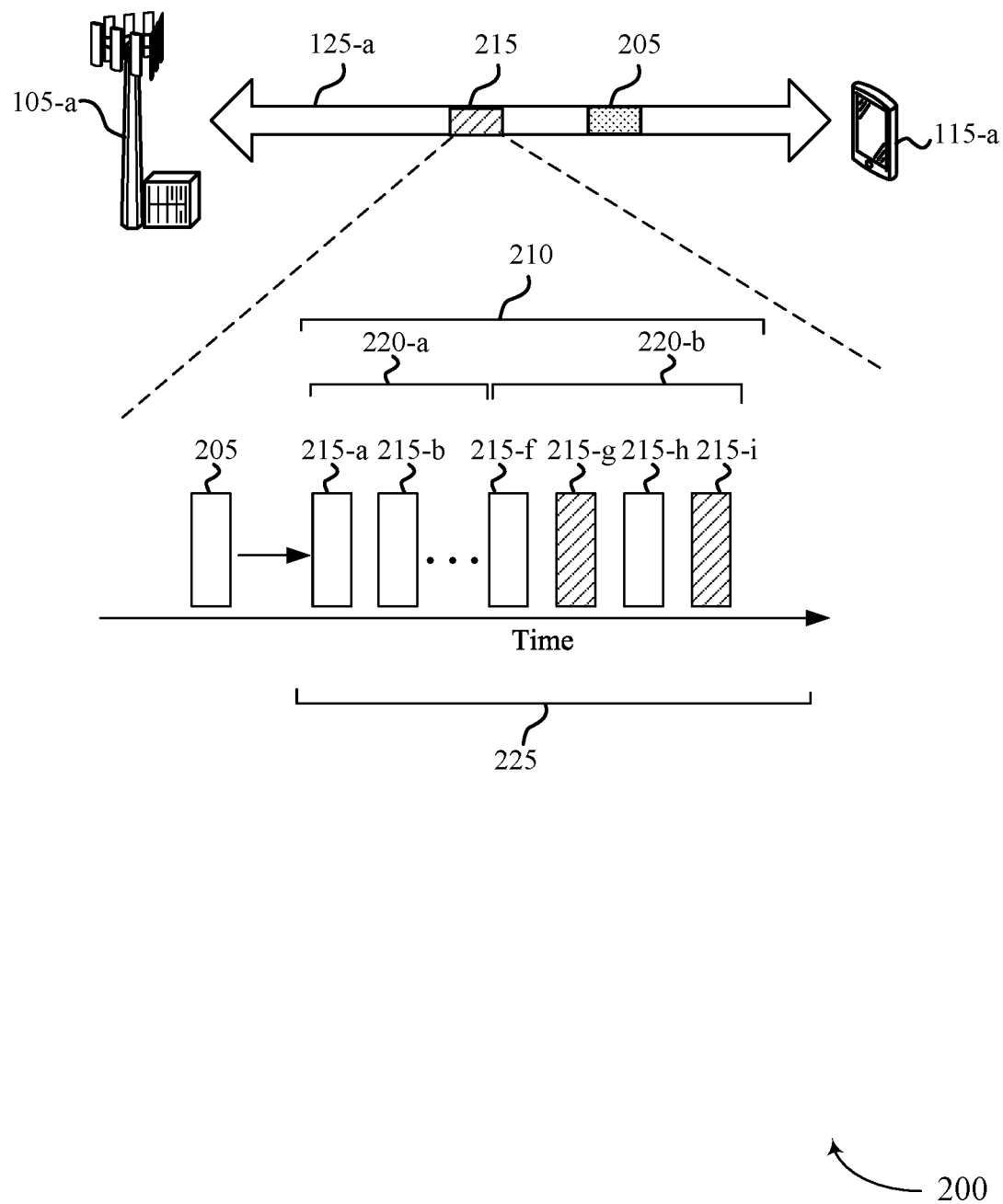
FIG. 2 illustrates an example of a wireless communications system that supports adaptation for extended reality transmissions in accordance with one or more aspects of the present disclosure.

FIG. 2 illustrates an example of a wireless communications system 200 that supports adaptation for extended reality transmissions in accordance with one or more aspects of the present disclosure. In some examples, the wireless communications system 200 may implement aspects of wireless communications system 100. The wireless communications system 200 may include a UE 115-a, which may be an example of a UE 115 as described herein. The wireless communications system 200 may include a network entity 105-a, which may be an example of a network entity 105 as described herein.

The UE 115-a may communicate with the network entity 105-a using a communication link 125-a, which may be examples of NR or LTE links between the UE 115-a and the network entity 105-a. The communication link 125-a may include a bi-directional link that enables both uplink and downlink communication. For example, the UE 115-a may transmit uplink signals, such as uplink control signals or uplink data signals, to the network entity 105-a using the communication link 125-a and the network entity 105-a may transmit downlink transmissions, such as downlink control signals or downlink data signals, to the UE 115-a using the communication link 125-a.

The UE 115-a may communicate XR communications with the network entity 105-a. For example, in downlink, the network entity 105-a may transmit packet transmissions 215 of an ADU 210 to the UE 115-a (e.g., the packet transmissions may be PDSCH transmissions), and in uplink the UE 115-a may transmit packet transmissions 215 of an ADU 210 to the network entity 105-a (e.g., the packet transmissions may be PUSCH transmissions). The UE 115-a and the network entity 105-a may support dynamic configuration of HARQ feedback, repetition, and/or MCS for transmissions 215 within an ADU 210. The UE 115-a and the network entity 105-a may communicate control signaling 205 dynamically configuring HARQ feedback, repetition, and/or MCS for transmissions 215 within the ADU 210.

In some cases, repetition for the transmissions 215 may be dynamically enabled and disabled. For example, in some cases, the control signaling 205 may be a control channel message (e.g., a DCI message or an uplink control information (UCI) message) or a medium access control (MAC) control element (MAC-CE). The repetition enabling information in the control signaling 205 may include an indicator for enabling or disabling repetition and/or the number of receptions (in some cases the number of repetitions may be 0 for disabling repetition). For example, transmission 215-*a* and transmission 215-*b* may be configured without repetitions, transmission 215-*f* may be configured with a repetition 215-*g*, and transmission 215-*h* may be configured with a repetition 215-*i*. In some examples, dynamic repetition enabling and disabling information may be provided separately for PDSCH and PUSCH or jointly for both PDSCH and PUSCH. In some examples, the control signaling 205 including the repetition enabling and disabling information may be transmitted by the UE 115-*a* to the network entity 105-*a* (e.g., for uplink or for joint indication for PDSCH and PUSCH) or from the network entity 105-*a* to the UE 115-*a* (e.g., for downlink or for joint indication for PDSCH and PUSCH). For DCI scheduled data transmissions 215, the scheduling DCI may be the control signaling 205 carrying the repetition enabling and disabling information. For DCI indicated downlink SPS data transmissions 215, the indicating DCI may be the control signaling 205 carrying the repetition enabling and disabling information. When transmitted from the UE 115-*a* to the network, the control signaling 205 carrying the repetition enabling and disabling information may be transmitted together with HARQ feedback for an earlier PDSCH transmission (e.g., the control signaling may be transmitted in a physical uplink control channel (PUCCH) message). When transmitted from the UE 115-*a* to the network, the control signaling 205 carrying the repetition enabling and disabling information may be the indicating UCI for the UCI indicated uplink CG data transmission 215. A default configuration may be that when the UE 115-*a* enters a discontinuous reception for a duration, repetition may be disabled.

In some cases, multiple transmissions 215 of an ADU may be indicated (e.g., scheduled or triggered) by a single control signaling 205, as opposed to each transmission 215 being indicated by a separate control signaling. For example, multiple PDSCHs or PUSCHs may be scheduled by a single scheduling PDCCH, or multiple PDSCHs or PUSCHs transmitted on a same SPS occasion or CG occasion may be triggered by a single control signaling. Single control signaling 205 may reduce the control overhead for burst data transmission. The control signaling 205 may indicate the number of PDSCHs and/or PUSCHs to be transmitted. The reduction in control overhead associated with a single control signaling 205 indicating multiple data transmissions 215 may enable power saving for a UE 115-*a* in downlink and the network entity 105-*a* in uplink. A single control signaling 205 indicating multiple data transmissions 215 may also be beneficial for low latency traffic, as the multiple PDSCHs or PUSCHs may be transmitted in consecutive slots 225, which may not increase the complexity of the UE implementation as all PDSCHs or PUSCHs after the temporally first PDSCH or PUSCH may have a loose timeline. If the timeline requirement is relaxed (e.g., for a relaxed processing time requirement or sparse PDCCH monitoring) for the temporally first PDSCH or PUSCH, the overall latency increase may be much smaller (and may be negligible) as compared to DGs with one DCI scheduling one PDSCH or PUSCH when the number of PDSCHs or PUSCHs scheduled or triggered by the single control signaling 205 is large (e.g., 10 or more). Accordingly, cross-slot scheduling with sparse PDCCH monitoring based on a single DCI (e.g., control signaling 205) scheduling multiple transmissions 215 (e.g., PDSCHs or PUSCHs) may be more efficient than DCI scheduling one PDSCH or one PUSCH.

In some cases, the control signaling 205 may indicate a set of multiple transmission configurations for a set of multiple time domain durations 220 within the ADU 210 and a start of a first time domain duration 220-*a* of the set of multiple time domain durations 220. In some cases, the set of multiple transmission configurations may indicate a number of repetitions for each transmission 215 within the ADU 210. In some cases, a number of repetitions for a transmission configuration may be zero (e.g., repetition is deactivated). In some cases, the set of multiple transmission configurations may indicate one or more parameters associated with each transmission configuration. For example, the one or more parameters may include whether HARQ feedback is activated and/or an MCS. The UE 115-*a* and the network entity 105-*a* may communicate a first subset of the transmissions 215 within the ADU during the first time domain duration 220-*a* in accordance with a first transmission configuration of the set of multiple transmission configurations, and the UE 115-*a* and the network entity 105-*a* may communicate a second subset of the transmissions 215 within the ADU 210 during the second time domain duration 220-*b* in accordance with a second transmission configuration of the set of multiple transmission configurations.

In some cases, when a DCI indicates an SPS occasion with multiple PDSCHs, a UCI indicates a CG occasion with multiple PUSCHs, or one DCI scheduling multiple PDSCHs or PUSCHs, some scheduling restrictions may be applied to the ADU 210. For example, for a single dynamic control signaling 205 indicating multiple PDSCH or PUSCH transmissions, the UE 115-*a* may not expect a second transmission 215 of the set of multiple transmissions within the ADU 210 with repetition activated prior to a first transmission 215 of the set of multiple transmissions within the ADU 210 with repetition deactivated. As another example, for a single dynamic control signaling 205 indicating multiple PDSCH or PUSCH transmissions, the UE 115-*a* may not expect a second transmission 215 of the set of multiple transmissions within the ADU 210 with HARQ deactivated prior to a first transmission 215 of the set of multiple transmissions within the ADU 210 with HARQ activated. As another example, for a single dynamic control signaling 205 indicating multiple PDSCH or PUSCH transmissions, the UE 115-*a* may not expect a second transmission 215 of the set of multiple transmissions within the ADU 210 with a first MCS prior to a first transmission 215 of the set of multiple transmissions within the ADU with a second MCS higher than the first MCS.

In some cases, in the presence of jitter, a more dynamic adaptation may be preferable as for each ADU 210, as the actual delay margin for UE processing may be different. For example, if the jitter causes a large additional delay to the data arrival time, the first portion (e.g., first time domain duration 220-*a*) with HARQ feedback based retransmission enabled may be shorter than the second portion (e.g., second time domain duration 220-*b*) with HARQ feedback based retransmission disabled. In some cases, the network may balance scheduling for multiple users (e.g., multiple UEs 115) dynamically.

In some cases, to enable dynamic adaptation of data configurations for each SPS or CG configuration, multiple candidate values for the set of configuration parameters such as whether HARQ feedback based retransmission is enabled or disabled, a first HARQ identifier (ID), a number of repetitions, and MCS may be configured. As HARQ feedback is per HARQ process enabled, adjusting the HARQ ID may equivalently adjust a number of HARQ processes with HARQ feedback based retransmission enabled. To enable dynamic adaptation of data configurations DG, the scheduling PDCCH may provide multiple MCSs.

For an SPS or CG occasion, the HARQ ID for each PDSCH or PUSCH may be incremented from the first HARQ ID with wrap around (e.g., 16 to 1 if 16 HARQ IDs are configured for the SPS or CG occasion). In some cases, for multiple transmissions 215 (e.g., multiple PDSCH or PUSCH transmissions) indicated by the single dynamic control signaling 205, the control signaling 205 may indicate the number of transmissions 215 (e.g., PDSCHs or the PUSCHs) with and without HARQ feedback based retransmission enabled. In some cases, for multiple transmissions 215 (e.g., multiple PDSCH or PUSCH transmissions) indicated by the single dynamic control signaling 205, the control signaling 205 may indicate the number of transmissions 215 (e.g., PDSCHs or the PUSCHs) with and without repetition. In some cases, for multiple transmissions 215 (e.g., multiple PDSCH or PUSCH transmissions) indicated by the single dynamic control signaling 205, the control signaling 205 may indicate the number of transmissions 215 (e.g., PDSCHs or the PUSCHs) with corresponding MCS values. In some cases, for multiple transmissions 215 (e.g., multiple PDSCH or PUSCH transmissions) indicated by the single dynamic control signaling 205, the control signaling 205 may indicate multiple parameters for the number of transmissions 215 (e.g., PDSCHs or the PUSCHs), including whether HARQ feedback based retransmission is enabled, whether repetition is enabled, a number of repetitions, and an MCS. For example, the control signaling 205 may indicate number of transmissions 215 (e.g., PDSCHs or the PUSCHs) with HARQ feedback based retransmission enabled and without repetition.

In some cases, the network entity 105-a may transmit control signaling 205 to the UE 115-a that separately configures a number of repetitions for each HARQ process of a set of multiple HARQ processes associated with the ADU 210. The control signaling 205 may indicate whether repetition is enabled for each HARQ process of the set of multiple HARQ processes. The control signaling may indicate a RVID sequence for repetitions for each HARQ process of the set of multiple HARQ processes. The UE 115-a and the network entity 105-a may communicate transmissions 215 within the ADU 210 in accordance with the control signaling 205. For example, the UE 115-a and the network entity 105-a may communicate a first transmission (e.g., transmission 215-a) within the ADU 210 in accordance with a first HARQ process and the associated number of repetitions (e.g., 0 repetitions) and communicate a second transmission (e.g., transmission 215-f) within the ADU 210 in accordance with a second HARQ process and the associated number of repetitions (e.g., 1 repetition 215-g). Such per HARQ process repetition configuration may be useful when repetition and HARQ feedback based retransmission are jointly adjusted.

Figure 3:
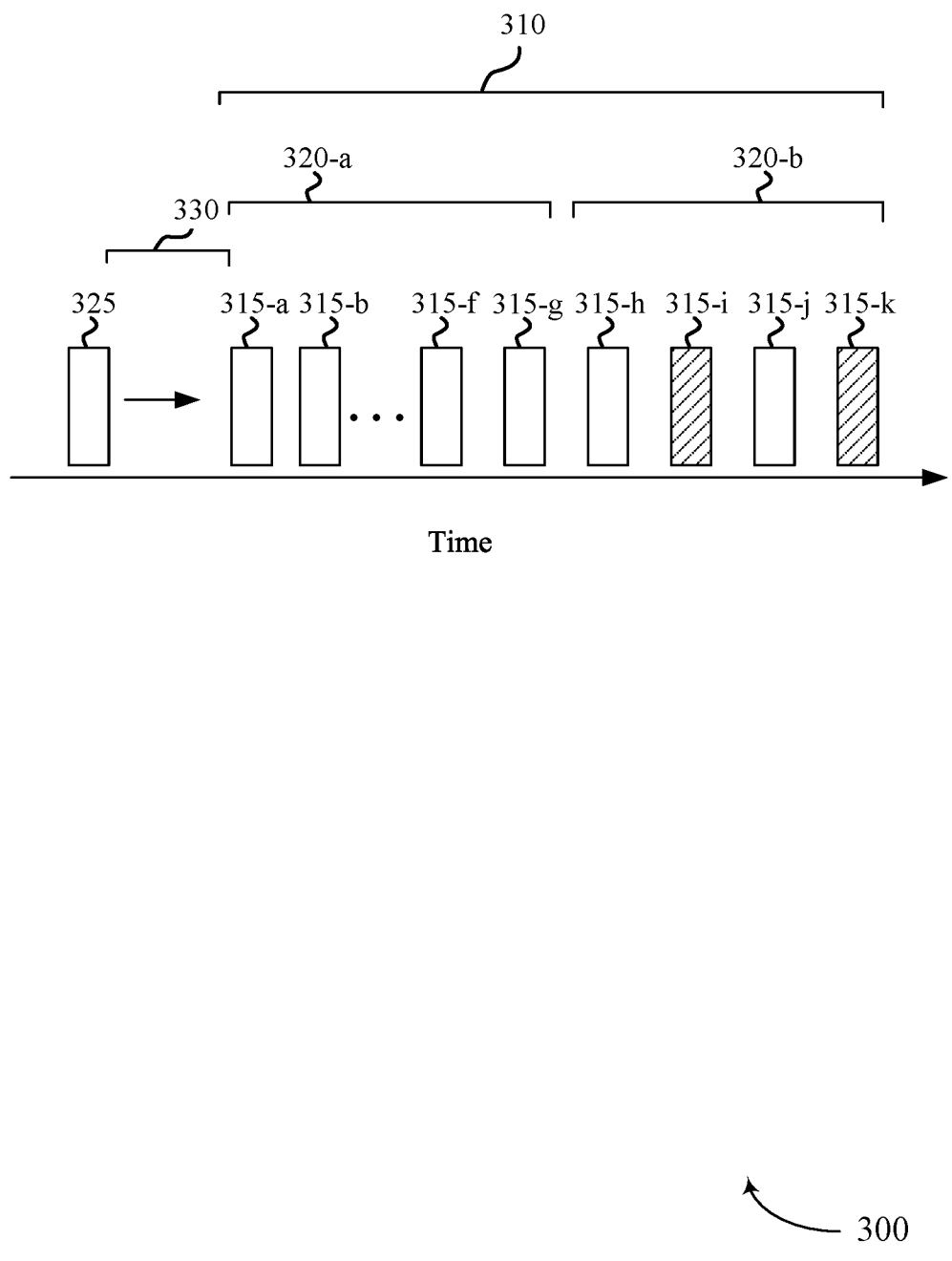
FIG. 3 illustrates an example of a timing diagram that supports adaptation for extended reality transmissions in accordance with one or more aspects of the present disclosure.

FIG. 3 illustrates an example of a timing diagram 300 that supports adaptation for extended reality transmissions in accordance with one or more aspects of the present disclosure. In some examples, the timing diagram 300 may implement aspects of wireless communications systems 100 or 200.

As described herein, in some cases, control signaling may indicate a set of multiple transmission configurations for a set of multiple time domain durations 320 (e.g., a first time domain duration 320-a and a second time domain duration 320-b) within an ADU 310 and a start of a first time domain duration 320-a of the set of multiple time domain durations 320. In some cases, the start time may be based on a wake up signal (WUS) 325 and a WUS offset 330. For example, a network entity 105 may transmit a WUS 325, and a timer may start at a period of time equal to the WUS offset 330. For example, the first time domain duration 320-a may start at the beginning of a connected mode discontinuous reception (CDRX) active time. The CDRX active time may be triggered by detection of the WUS 325.

The timer may indicate the duration of the first time domain duration 320-a A first transmission configuration may be applied to transmissions 315 within the first time domain duration 320-a (e.g., transmission 315-a, transmission 315-b, . . . transmission 315-f, and transmission 315-g). In some cases, a second timer may indicate a duration of a second time domain duration 320-b. A second transmission configuration may be applied to transmissions 315 within the second time domain duration 320-b (e.g., transmission 315-h, repetition 315-i, transmission 315-j, and repetition 315-k). In some cases, a second WUS may indicate a start of the second time domain duration 320-b. In some cases, another control message (e.g., a DCI scheduling transmissions of the second time domain duration 320-b) may indicate the start of the second time domain duration 320-b.

Figure 4:
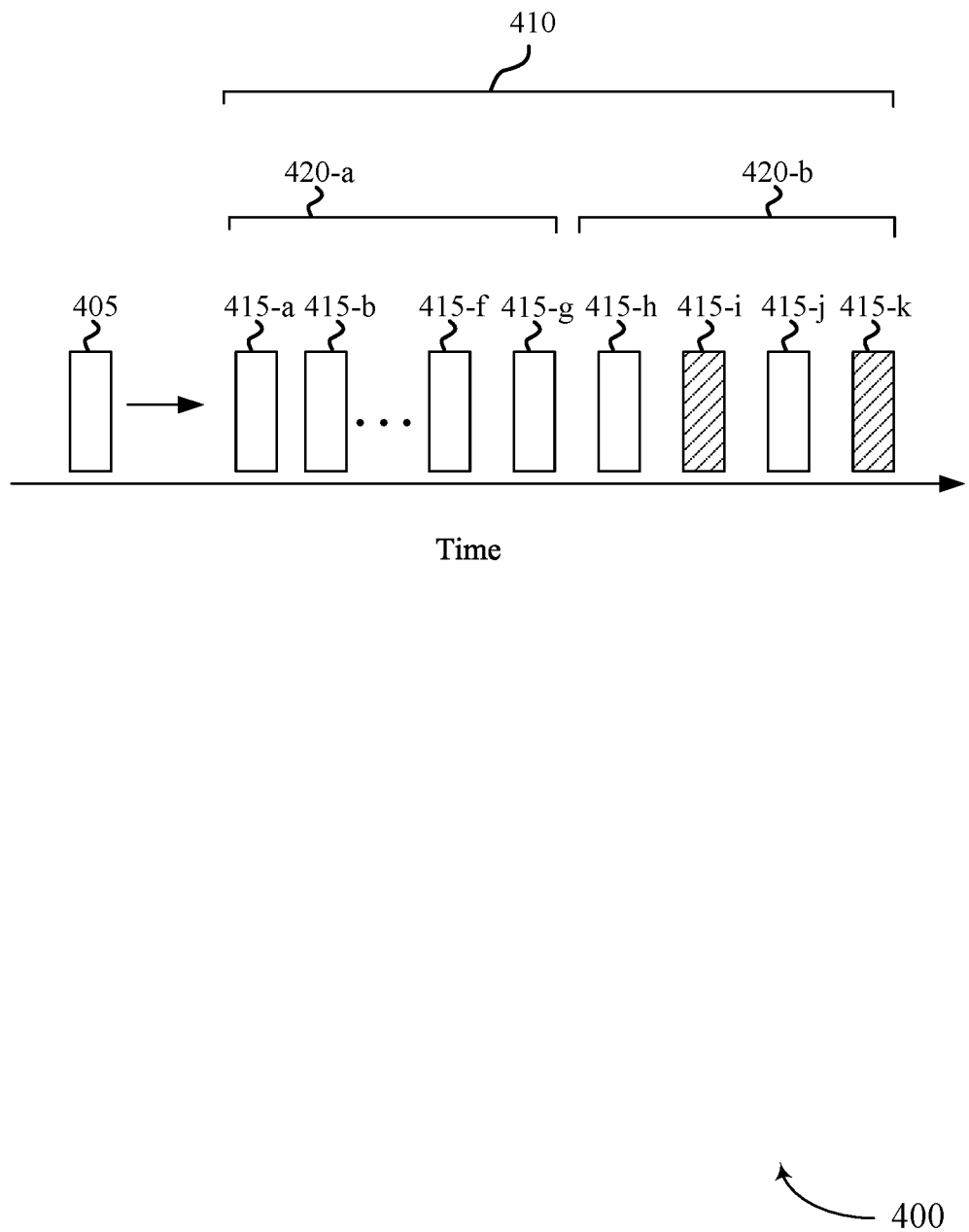
FIG. 4 illustrates an example of a timing diagram that supports adaptation for extended reality transmissions in accordance with one or more aspects of the present disclosure.

FIG. 4 illustrates an example of a timing diagram 400 that supports adaptation for extended reality transmissions in accordance with one or more aspects of the present disclosure. In some examples, the timing diagram 400 may implement aspects of wireless communications systems 100 or 200.

As described herein, in some cases, control signaling 405 may indicate a set of multiple transmission configurations for a set of multiple time domain durations 420 (e.g., a first time domain duration 420-a and a second time domain duration 420-b) within an ADU 410 and a start of a first time domain duration 420-a of the set of multiple time domain durations 420. For example, the control signaling 405 may initiate a timer that runs for a duration corresponding to the first time domain duration 420-a.

In some cases, a start time of the first time domain duration 420-a may be based on the expected data arrival time for the ADU 410 for video frame data (e.g., every $\frac{1}{60}$ seconds). In some cases, a start time of the first time domain duration 420-a may be based on the first PDSCH for downlink or the first PUSCH for uplink transmitted within the CDRX active time. In some cases, a start time of the first time domain duration 420-a may be based on the first PDSCH for downlink or the first PUSCH for uplink among multiple PDSCH or PUSCH transmissions indicated by a single dynamic control signaling 405 (e.g., a DCI indicated SPS with multiple PDSCHs, a UCI indicated CG occasion with multiple PUSCHs, or one DCI scheduling multiple PDSCHs or PUSCHs).

In some examples, durations of the first time domain duration 420-a and the second time domain duration 420-b may be defined in terms of slots or milliseconds (or other desired time interval). For example, a respective timer may be defined for each time domain portion 420. In some examples, durations of the first time domain duration 420-a and the second time domain duration 420-b may be defined in terms a number of transmissions 415 (e.g., a number of PDSCH or PUSCH transmissions 415 within each time domain duration 420).

A first transmission configuration may be applied to transmissions 415 within the first time domain portion 420-a (e.g., transmission 415-a, transmission 415-b, . . . transmission 415-f, and transmission 415-g). In some cases, a second timer may indicate a duration of a second time domain duration 420-b. A second transmission configuration may be applied to transmissions 415 within the second time domain portion (e.g., transmission 415-h, repetition 415-i, transmission 415-*j*, and repetition 415-*k*). For example, if two time domain durations 420 (e.g., first time domain duration 420-*a* and second time domain duration 420-*b*) are configured by the control signaling 405, the first time domain duration 420-*a* may be configured with a first timer. Before the first timer expires, HARQ feedback may be enabled, repetition may be disabled, and a higher MCS may be used. After the timer expires, the second time domain duration 420-*b* may be activated, and HARQ feedback may be disabled, repetition may be enabled, and a lower MCS may be used until the end of the discontinuous reception (DRX) active time. In some cases, a duration of the first time domain portion 420-*a*, the second time domain portion 420-*b*, or both, may be specified in a number of PDSCH slots or in a number of PUSCH slots, or a combination thereof. The duration of the first time domain portion 420-*a*, the second time domain portion 420-*b*, or both may be based on count of PDSCH transmissions for downlink and PUSCH transmissions for uplink in an ADU.

Figure 5:
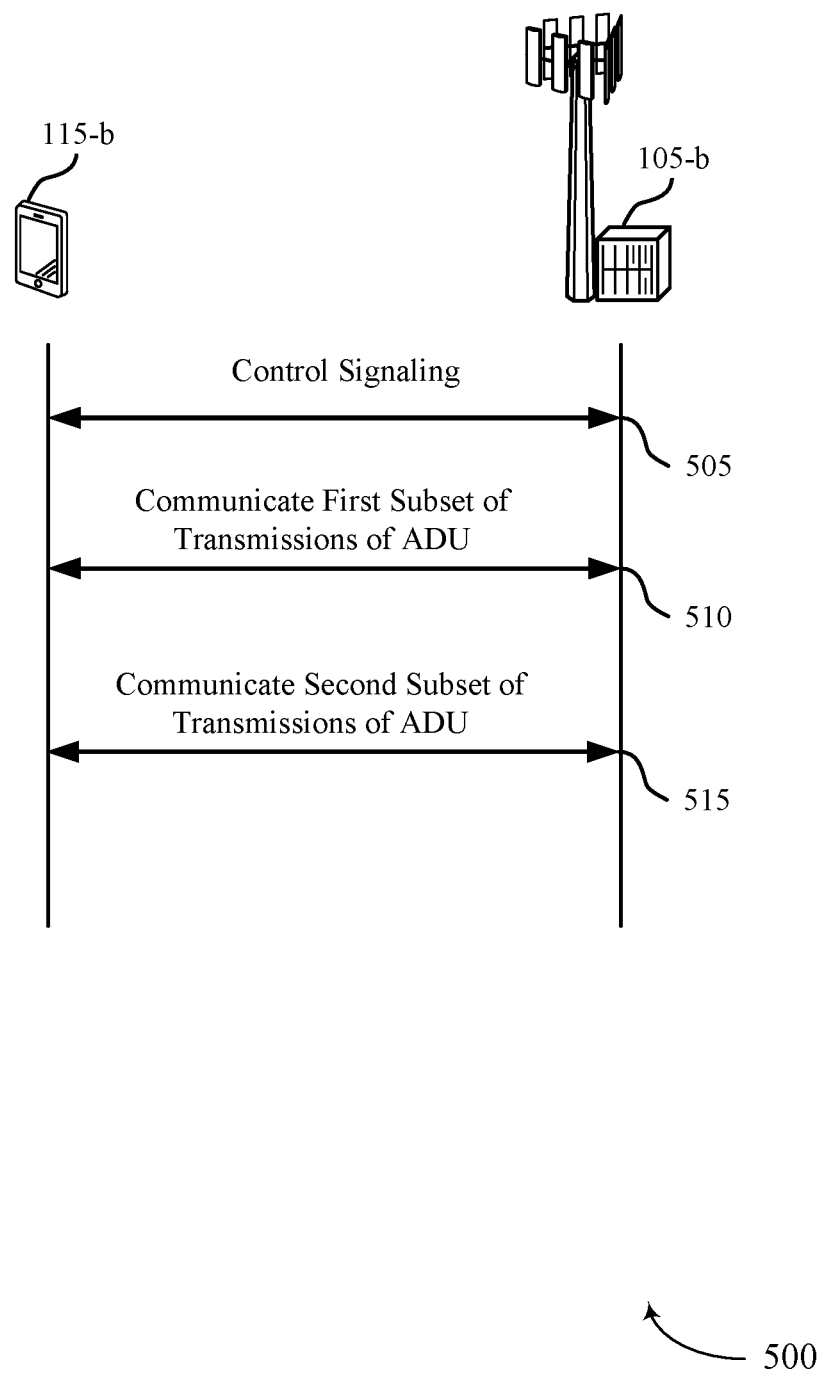
FIG. 5 illustrates an example of a process flow that supports adaptation for extended reality transmissions in accordance with one or more aspects of the present disclosure.

FIG. 5 illustrates an example of a process flow 500 that supports adaptation for extended reality transmissions in accordance with one or more aspects of the present disclosure. The process flow 500 may include a UE 115-*b*, which may be an example of a UE 115 as described herein. The process flow 500 may include a network entity 105-*b*, which may be an example of a network entity 105 as described herein. In the following description of the process flow 500, the operations between the network entity 105-*b* and the UE 115-*b* may be transmitted in a different order than the example order shown, or the operations performed by the network entity 105-*b* and the UE 115-*b* may be performed in different orders or at different times. Some operations may also be omitted from the process flow 500, and other operations may be added to the process flow 500.

At 505, the UE 115-*b* and the network entity 105-*b* may communicate control signaling indicating a set of multiple transmission configurations for a set of multiple time domain durations within an ADU and a start of a first time domain duration of the set of multiple time domain durations, the set of multiple transmission configurations indicating a respective number of repetitions for each transmission of a set of multiple transmissions within the ADU. For example, for a downlink ADU, the network entity 105-*b* may transmit the control signaling to the UE 115-*b*, and for an uplink ADU, the UE 115-*b* may transmit the control signaling to the network entity 105-*b*.

At 510, the UE 115-*b* and the network entity 105-*b* may communicate, during the first time domain duration, a first subset of the set of multiple transmissions within the ADU in accordance with a first transmission configuration of the set of multiple transmission configurations. For example, for a downlink ADU, the network entity 105-*b* may transmit the first subset of the set of multiple transmissions to the UE 115-*b*, and for an uplink ADU, the UE 115-*b* may transmit the first subset of the set of multiple transmissions to the network entity 105-*b*.

At 515, the UE 115-*b* and the network entity 105-*b* may communicate, during a second time domain duration of the set of multiple time domain durations, a second subset of the set of multiple transmissions within the ADU in accordance with a second transmission configuration of the set of multiple transmission configurations. For example, for a downlink ADU, the network entity 105-*b* may transmit the second subset of the set of multiple transmissions to the UE 115-*b*, and for an uplink ADU, the UE 115-*b* may transmit the second subset of the set of multiple transmissions to the network entity 105-*b*.

In some examples, communicating the control signaling at 505 includes transmitting, from the network entity 105-*b* to the UE 115-*b*, a DCI message scheduling the set of multiple transmissions within the ADU.

In some examples, communicating the control signaling at 505 includes communicating a first control message indicating the set of multiple transmission configurations for the set of multiple time domain durations and communicating a second control message indicating the start of the first time domain duration. In some examples, communicating the control signaling at 505 includes communicating a third control message indicating a start of the second time domain duration.

In some examples, communicating the control signaling at 505 includes communicating the control signaling indicating one or more parameters associated with each transmission configuration, the one or more parameters including activation or deactivation of retransmission based on HARQ, an MCS, or both.

In some examples, communicating the control signaling at 505 includes transmitting, from the network entity 105-*b* to the UE 115-*b*, a wake-up signal, where a timing of the start of the first time domain duration of the set of multiple time domain durations is based on the wake-up signal.

In some examples, communicating the control signaling at 505 includes indicating a respective timer associated with each time domain duration of the set of multiple time domain durations, where a number of transmissions within each time domain duration of the set of multiple time domain durations is based on the respective timer associated with each time domain duration of the set of multiple time domain durations.

In some examples, communicating the control signaling at 505 includes indicating a number of slots associated with each time domain duration of the set of multiple time domain durations.

In some examples, the UE 115-*b* may not expect a second transmission of the set of multiple transmissions within the ADU with repetition activated prior to a first transmission of the set of multiple transmissions within the ADU with repetition deactivated. In some examples, the UE 115-*b* may not expect a second transmission of the set of multiple transmissions within the ADU with HARQ deactivated prior to a first transmission of the set of multiple transmissions within the ADU with HARQ activated. In some examples, the UE 115-*b* may not expect a second transmission of the set of multiple transmissions within the ADU with a first MCS prior to a first transmission of the set of multiple transmissions within the ADU with a second MCS higher than the first MCS.

In some examples, communicating the control signaling at 505 includes indicating, for each transmission of the set of multiple transmissions, a respective HARQ identifier and one or more parameters associated with the respective transmission, the one or more parameters including a number of repetitions, an MCS value, or both.

In some examples, a first number of transmissions of the first subset of the set of multiple transmissions is less than a second number of transmissions of the second subset of the set of multiple transmissions.

Figure 6:
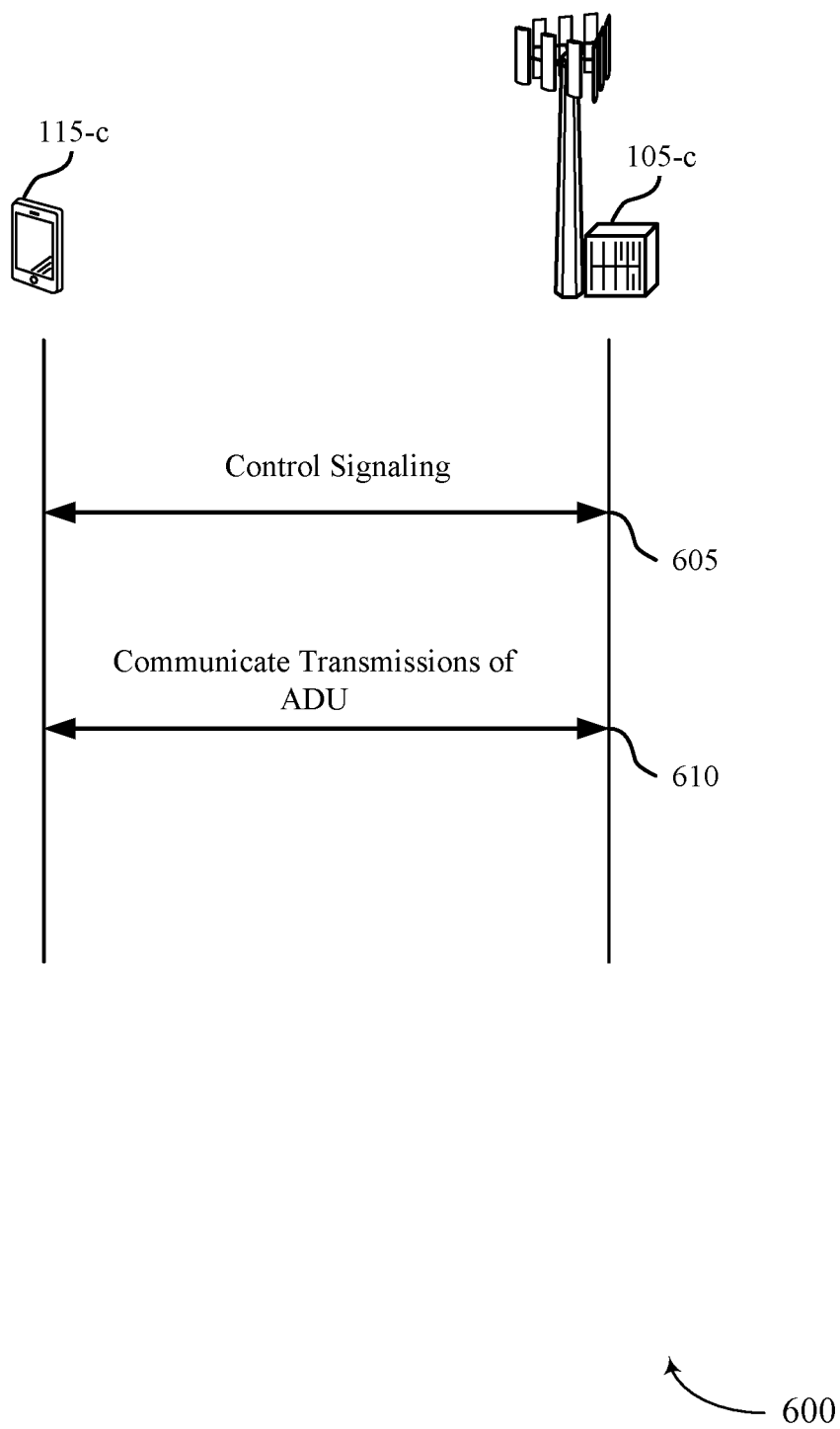
FIG. 6 illustrates an example of a process flow that supports adaptation for extended reality transmissions in accordance with one or more aspects of the present disclosure.

FIG. 6 illustrates an example of a process flow 600 that supports adaptation for extended reality transmissions in accordance with one or more aspects of the present disclosure. The process flow 600 may include a UE 115-*c*, which may be an example of a UE 115 as described herein. The process flow 600 may include a network entity 105-*c*, which may be an example of a network entity 105 as described herein. In the following description of the process flow 600, the operations between the network entity 105-c and the UE 115-c may be transmitted in a different order than the example order shown, or the operations performed by the network entity 105-c and the UE 115-c may be performed in different orders or at different times. Some operations may also be omitted from the process flow 600, and other operations may be added to the process flow 600.

At 605, the UE 115-c may receive, from the network entity 105-c, control signaling that separately configures a number of repetitions for each feedback process of a set of multiple feedback processes associated with an ADU. The control signaling may whether repetition is enabled for each feedback process of the set of multiple feedback processes. The control signaling may further indicate an RVID sequence for repetitions for each feedback process of the set of multiple feedback processes.

At 610, the UE 115-c and the network entity 105-c may communicate a set of multiple transmissions within the ADU in accordance with the control signaling.

In some examples, a respective transmission of the set of multiple transmissions is associated with a respective feedback process of the set of multiple feedback processes.

In some examples, communicating the set of multiple transmissions at 610 includes communicating a first transmission of the set of multiple transmissions and a repetition of the first transmission within the ADU in accordance with a respective redundancy version identifier sequence for repetitions associated with a first feedback process of the set of multiple feedback processes indicating that repetition is enabled.

In some examples, communicating the set of multiple transmissions at 610 includes communicating a first transmission of the set of multiple transmissions within the ADU in accordance with a respective redundancy version identifier sequence for repetitions associated with a first feedback process of the set of multiple feedback processes indicating that repetition is disabled, and a repetition of the first transmission is not transmitted within the ADU.

In some examples, the control signaling at 605 is transmitted via one of a DCI message or a MAC-CE. In some examples, the control signaling at 605 may indicate a respective MCS associated with each feedback process of the set of multiple feedback processes.

Figure 7:
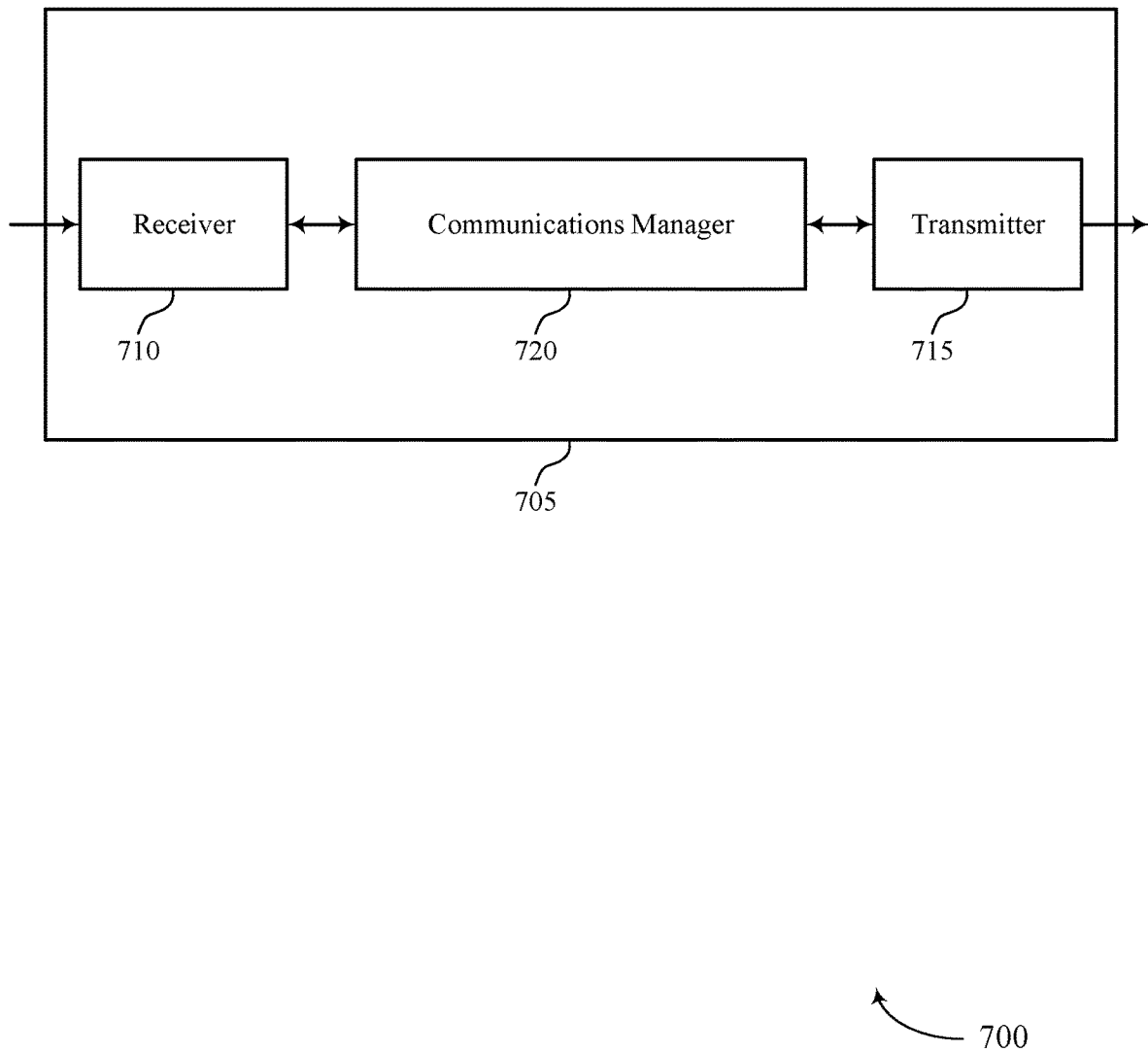
FIGS. 7 and 8 show block diagrams of devices that support adaptation for extended reality transmissions in accordance with one or more aspects of the present disclosure.

FIG. 7 shows a block diagram 700 of a device 705 that supports adaptation for extended reality transmissions in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to adaptation for extended reality transmissions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to adaptation for extended reality transmissions). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of adaptation for extended reality transmissions as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 may be configured as or otherwise support a means for communicating control signaling indicating a set of multiple transmission configurations for a set of multiple time domain durations within an application data unit and a start of a first time domain duration of the set of multiple time domain durations, the set of multiple transmission configurations indicating a respective number of repetitions for each transmission of a set of multiple transmissions within the application data unit. The communications manager 720 may be configured as or otherwise support a means for communicating, with a network entity during the first time domain duration, a first subset of the set of multiple transmissions within the application data unit in accordance with a first transmission configuration of the set of multiple transmission configurations. The communications manager 720 may be configured as or otherwise support a means for communicating, with the network entity during a second time domain duration of the set of multiple time domain durations, a second subset of the set of multiple transmissions within the application data unit in accordance with a second transmission configuration of the set of multiple transmission configurations.

Additionally, or alternatively, the communications manager 720 may support wireless communications at a UE in accordance with examples as disclosed herein. For example, the communications manager 720 may be configured as or otherwise support a means for receiving control signaling that separately configures a number of repetitions for each feedback process of a set of multiple feedback processes associated with an application data unit, the control signaling indicating whether repetition is enabled for each feedback process of the set of multiple feedback processes, and indicating a redundancy version identifier sequence for repetitions for each feedback process of the set of multiple feedback processes. The communications manager 720 may be configured as or otherwise support a means for communicating, with a network entity, a set of multiple transmissions within the application data unit in accordance with the control signaling.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources by enabling dynamic configuring of transmissions within an ADU.

Figure 8:
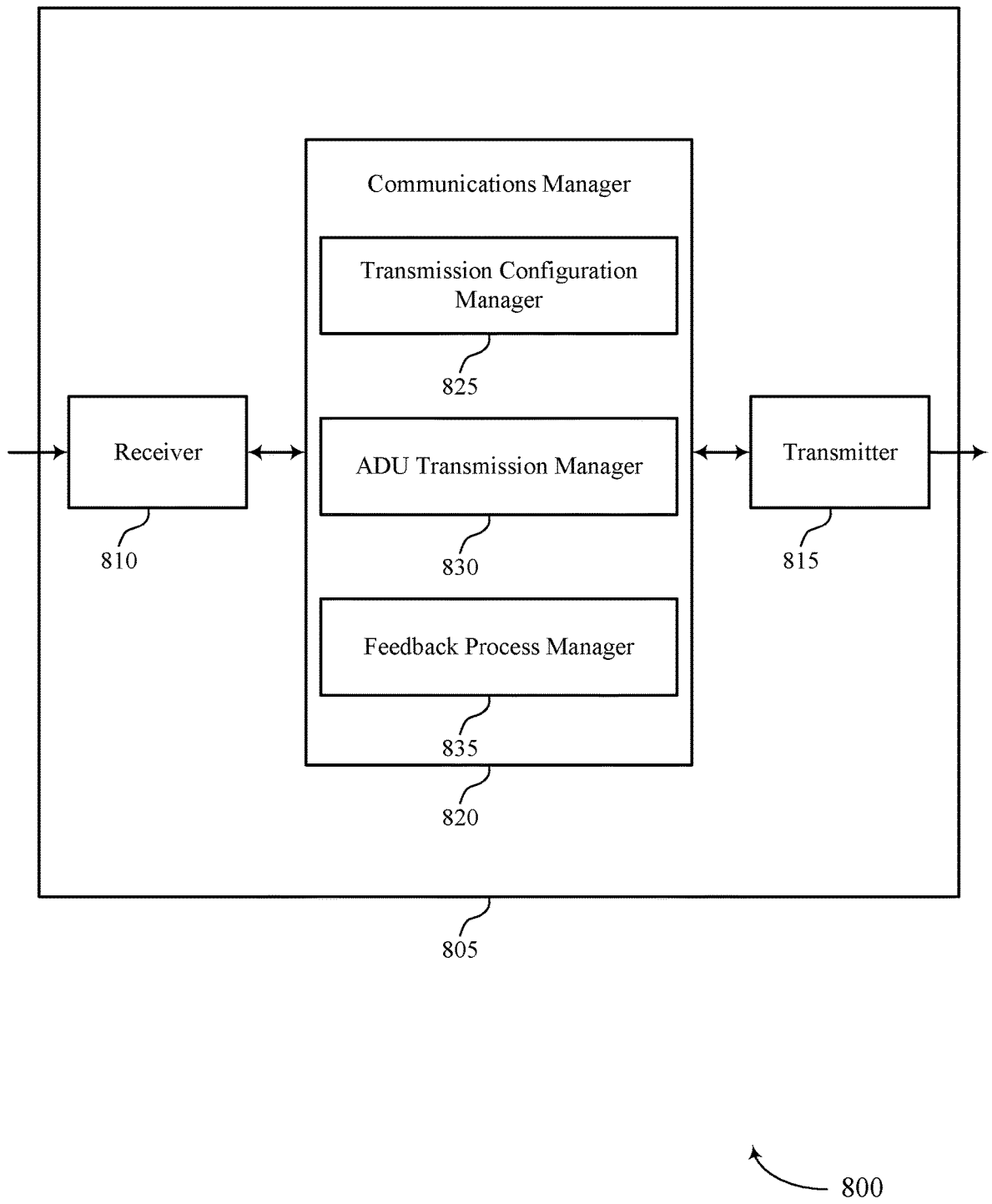

FIG. 8 shows a block diagram 800 of a device 805 that supports adaptation for extended reality transmissions in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to adaptation for extended reality transmissions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to adaptation for extended reality transmissions). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of adaptation for extended reality transmissions as described herein. For example, the communications manager 820 may include a transmission configuration manager 825, an ADU transmission manager 830, a feedback process manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The transmission configuration manager 825 may be configured as or otherwise support a means for communicating control signaling indicating a set of multiple transmission configurations for a set of multiple time domain durations within an application data unit and a start of a first time domain duration of the set of multiple time domain durations, the set of multiple transmission configurations indicating a respective number of repetitions for each transmission of a set of multiple transmissions within the application data unit. The ADU transmission manager 830 may be configured as or otherwise support a means for communicating, with a network entity during the first time domain duration, a first subset of the set of multiple transmissions within the application data unit in accordance with a first transmission configuration of the set of multiple transmission configurations. The ADU transmission manager 830 may be configured as or otherwise support a means for communicating, with the network entity during a second time domain duration of the set of multiple time domain durations, a second subset of the set of multiple transmissions within the application data unit in accordance with a second transmission configuration of the set of multiple transmission configurations.

Additionally, or alternatively, the communications manager 820 may support wireless communications at a UE in accordance with examples as disclosed herein. The feedback process manager 835 may be configured as or otherwise support a means for receiving control signaling that separately configures a number of repetitions for each feedback process of a set of multiple feedback processes associated with an application data unit, the control signaling indicating whether repetition is enabled for each feedback process of the set of multiple feedback processes, and indicating a redundancy version identifier sequence for repetitions for each feedback process of the set of multiple feedback processes. The ADU transmission manager 830 may be configured as or otherwise support a means for communicating, with a network entity, a set of multiple transmissions within the application data unit in accordance with the control signaling.

Figure 9:
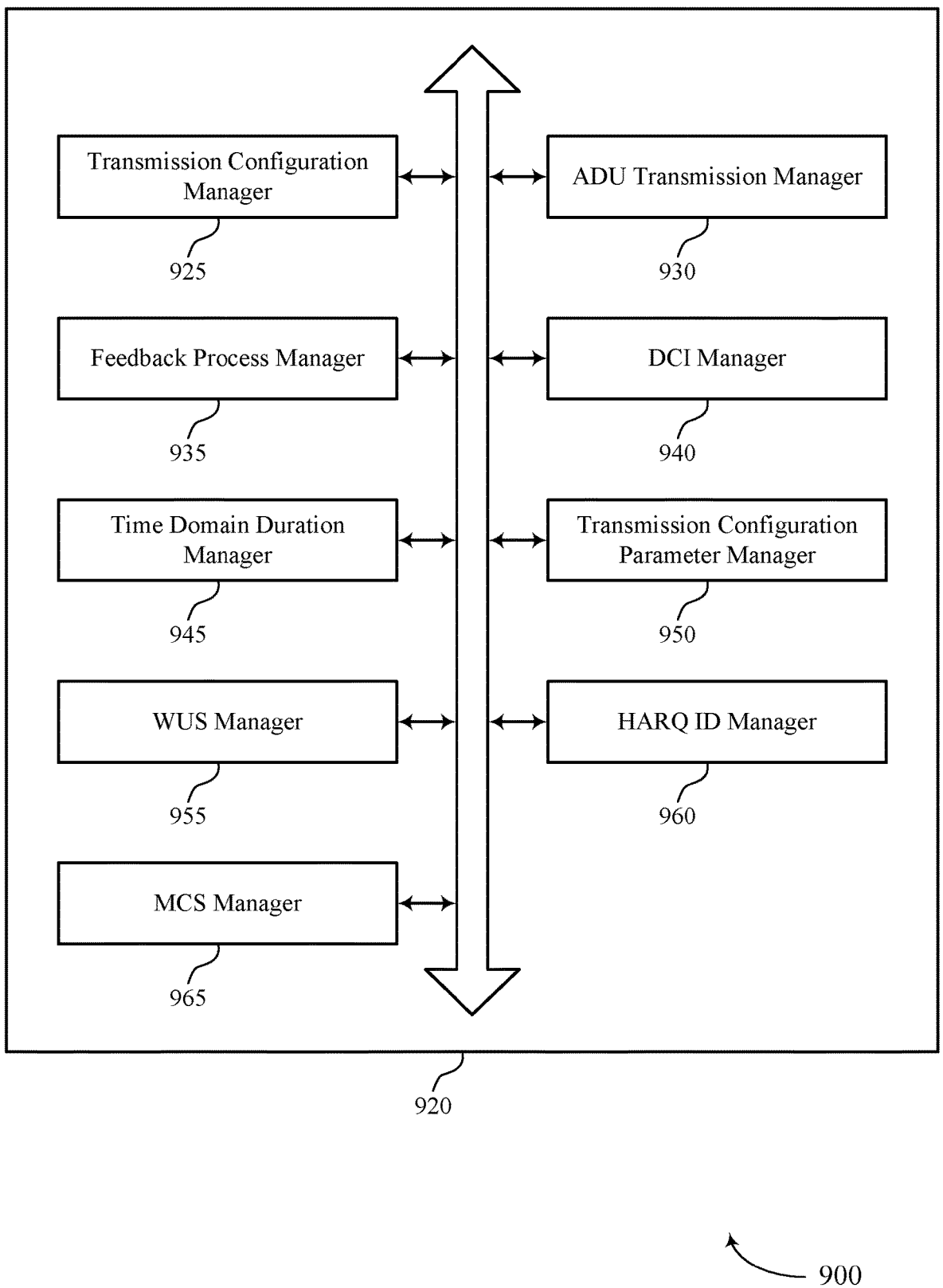
FIG. 9 shows a block diagram of a communications manager that supports adaptation for extended reality transmissions in accordance with one or more aspects of the present disclosure.

FIG. 9 shows a block diagram 900 of a communications manager 920 that supports adaptation for extended reality transmissions in accordance with one or more aspects of the present disclosure. The communications manager 920 may be an example of aspects of a communications manager 720, a communications manager 820, or both, as described herein. The communications manager 920, or various components thereof, may be an example of means for performing various aspects of adaptation for extended reality transmissions as described herein. For example, the communications manager 920 may include a transmission configuration manager 925, an ADU transmission manager 930, a feedback process manager 935, a DCI manager 940, a time domain duration manager 945, a transmission configuration parameter manager 950, a WUS manager 955, an HARQ ID manager 960, an MCS manager 965, or any combination thereof. Each of these components may communicate, directly or indirectly, with one another (e.g., via one or more buses).

The communications manager 920 may support wireless communications at a UE in accordance with examples as disclosed herein. The transmission configuration manager 925 may be configured as or otherwise support a means for communicating control signaling indicating a set of multiple transmission configurations for a set of multiple time domain durations within an application data unit and a start of a first time domain duration of the set of multiple time domain durations, the set of multiple transmission configurations indicating a respective number of repetitions for each transmission of a set of multiple transmissions within the application data unit. The ADU transmission manager 930 may be configured as or otherwise support a means for communicating, with a network entity during the first time domain duration, a first subset of the set of multiple transmissions within the application data unit in accordance with a first transmission configuration of the set of multiple transmission configurations. In some examples, the ADU transmission manager 930 may be configured as or otherwise support a means for communicating, with the network entity during a second time domain duration of the set of multiple time domain durations, a second subset of the set of multiple transmissions within the application data unit in accordance with a second transmission configuration of the set of multiple transmission configurations.

In some examples, to support communicating the control signaling, the DCI manager 940 may be configured as or otherwise support a means for receiving a DCI message scheduling the set of multiple transmissions within the application data unit.

In some examples, to support communicating the control signaling, the transmission configuration manager 925 may be configured as or otherwise support a means for communicating a first control message indicating the set of multiple transmission configurations for the set of multiple time domain durations. In some examples, to support communicating the control signaling, the time domain duration manager 945 may be configured as or otherwise support a means for communicating a second control message indicating the start of the first time domain duration.

In some examples, to support communicating the control signaling, the time domain duration manager 945 may be configured as or otherwise support a means for communicating a third control message indicating a start of the second time domain duration.

In some examples, to support communicating the control signaling, the transmission configuration parameter manager 950 may be configured as or otherwise support a means for communicating the control signaling indicating one or more parameters associated with each transmission configuration, the one or more parameters including activation or deactivation of retransmission based on HARQ, an MCS, or both.

In some examples, to support communicating the control signaling, the WUS manager 955 may be configured as or otherwise support a means for receiving a wake-up signal, where a timing of the start of the first time domain duration of the set of multiple time domain durations is based on the wake-up signal.

In some examples, to support communicating the control signaling, the time domain duration manager 945 may be configured as or otherwise support a means for communicating the control signaling indicating a respective timer associated with each time domain duration of the set of multiple time domain durations, where a number of transmissions within each time domain duration of the set of multiple time domain durations is based on the respective timer associated with each time domain duration of the set of multiple time domain durations.

In some examples, to support communicating the control signaling, the time domain duration manager 945 may be configured as or otherwise support a means for communicating the control signaling indicating a number of slots associated with each time domain duration of the set of multiple time domain durations.

In some examples, the UE does not expect a second transmission of the set of multiple transmissions within the application data unit with repetition activated prior to a first transmission of the set of multiple transmissions within the application data unit with repetition deactivated.

In some examples, the UE does not expect a second transmission of the set of multiple transmissions within the application data unit with HARQ deactivated prior to a first transmission of the set of multiple transmissions within the application data unit with HARQ activated.

In some examples, the UE does not expect a second transmission of the set of multiple transmissions within the application data unit with a first MCS prior to a first transmission of the set of multiple transmissions within the application data unit with a second MCS higher than the first MCS.

In some examples, to support communicating the control signaling, the HARQ ID manager 960 may be configured as or otherwise support a means for communicating the control signaling indicating, for each transmission of the set of multiple transmissions, a respective HARQ identifier and one or more parameters associated with the respective transmission, the one or more parameters including a number of repetitions, an MCS value, or both.

In some examples, a first number of transmissions of the first subset of the set of multiple transmissions is less than a second number of transmissions of the second subset of the set of multiple transmissions.

Additionally, or alternatively, the communications manager 920 may support wireless communications at a UE in accordance with examples as disclosed herein. The feedback process manager 935 may be configured as or otherwise support a means for receiving control signaling that separately configures a number of repetitions for each feedback process of a set of multiple feedback processes associated with an application data unit, the control signaling indicating whether repetition is enabled for each feedback process of the set of multiple feedback processes, and indicating a redundancy version identifier sequence for repetitions for each feedback process of the set of multiple feedback processes. In some examples, the ADU transmission manager 930 may be configured as or otherwise support a means for communicating, with a network entity, a set of multiple transmissions within the application data unit in accordance with the control signaling.

In some examples, a respective transmission of the set of multiple transmissions is associated with a respective feedback process of the set of multiple feedback processes.

In some examples, to support communicating the set of multiple transmissions, the ADU transmission manager 930 may be configured as or otherwise support a means for communicating a first transmission of the set of multiple transmissions and a repetition of the first transmission within the application data unit in accordance with a respective redundancy version identifier sequence for repetitions associated with a first feedback process of the set of multiple feedback processes indicating that repetition is enabled.

In some examples, to support communicating the set of multiple transmissions, the ADU transmission manager 930 may be configured as or otherwise support a means for communicating a first transmission of the set of multiple transmissions within the application data unit in accordance with a respective redundancy version identifier sequence for repetitions associated with a first feedback process of the set of multiple feedback processes indicating that repetition is disabled, where a repetition of the first transmission is not transmitted within the application data unit.

In some examples, to support receiving the control signaling, the feedback process manager 935 may be configured as or otherwise support a means for receiving the control signaling via one of a DCI message or a medium access control (MAC) control element.

In some examples, to support receiving the control signaling, the MCS manager 965 may be configured as or otherwise support a means for receiving an indication of a respective MCS associated with each feedback process of the set of multiple feedback processes.

Figure 10:
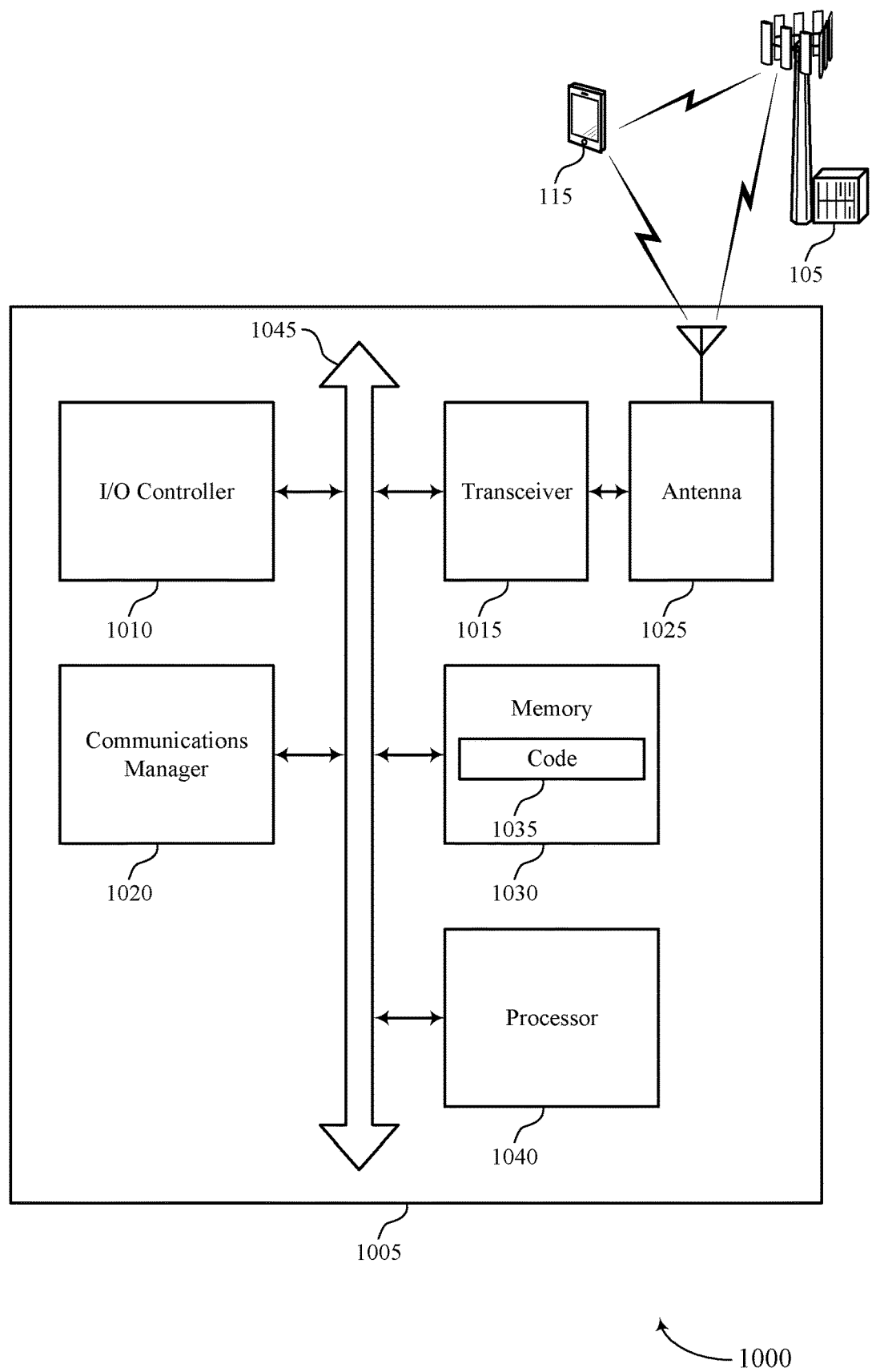
FIG. 10 shows a diagram of a system including a device that supports adaptation for extended reality transmissions in accordance with one or more aspects of the present disclosure.

FIG. 10 shows a diagram of a system 1000 including a device 1005 that supports adaptation for extended reality transmissions in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting adaptation for extended reality transmissions). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for communicating control signaling indicating a set of multiple transmission configurations for a set of multiple time domain durations within an application data unit and a start of a first time domain duration of the set of multiple time domain durations, the set of multiple transmission configurations indicating a respective number of repetitions for each transmission of a set of multiple transmissions within the application data unit. The communications manager 1020 may be configured as or otherwise support a means for communicating, with a network entity during the first time domain duration, a first subset of the set of multiple transmissions within the application data unit in accordance with a first transmission configuration of the set of multiple transmission configurations. The communications manager 1020 may be configured as or otherwise support a means for communicating, with the network entity during a second time domain duration of the set of multiple time domain durations, a second subset of the set of multiple transmissions within the application data unit in accordance with a second transmission configuration of the set of multiple transmission configurations.

Additionally, or alternatively, the communications manager 1020 may support wireless communications at a UE in accordance with examples as disclosed herein. For example, the communications manager 1020 may be configured as or otherwise support a means for receiving control signaling that separately configures a number of repetitions for each feedback process of a set of multiple feedback processes associated with an application data unit, the control signaling indicating whether repetition is enabled for each feedback process of the set of multiple feedback processes, and indicating a redundancy version identifier sequence for repetitions for each feedback process of the set of multiple feedback processes. The communications manager 1020 may be configured as or otherwise support a means for communicating, with a network entity, a set of multiple transmissions within the application data unit in accordance with the control signaling.

By including or configuring the communications manager 1020 in accordance with examples as described herein, the device 1005 may support techniques for improved communication reliability, reduced latency, more efficient utilization of communication resources, improved coordination between devices, and improved utilization of processing capability by enabling dynamic configuring of transmissions within an ADU.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of adaptation for extended reality transmissions as described herein, or the processor 1040 and the memory 1030 may be otherwise configured to perform or support such operations.

Figure 11:
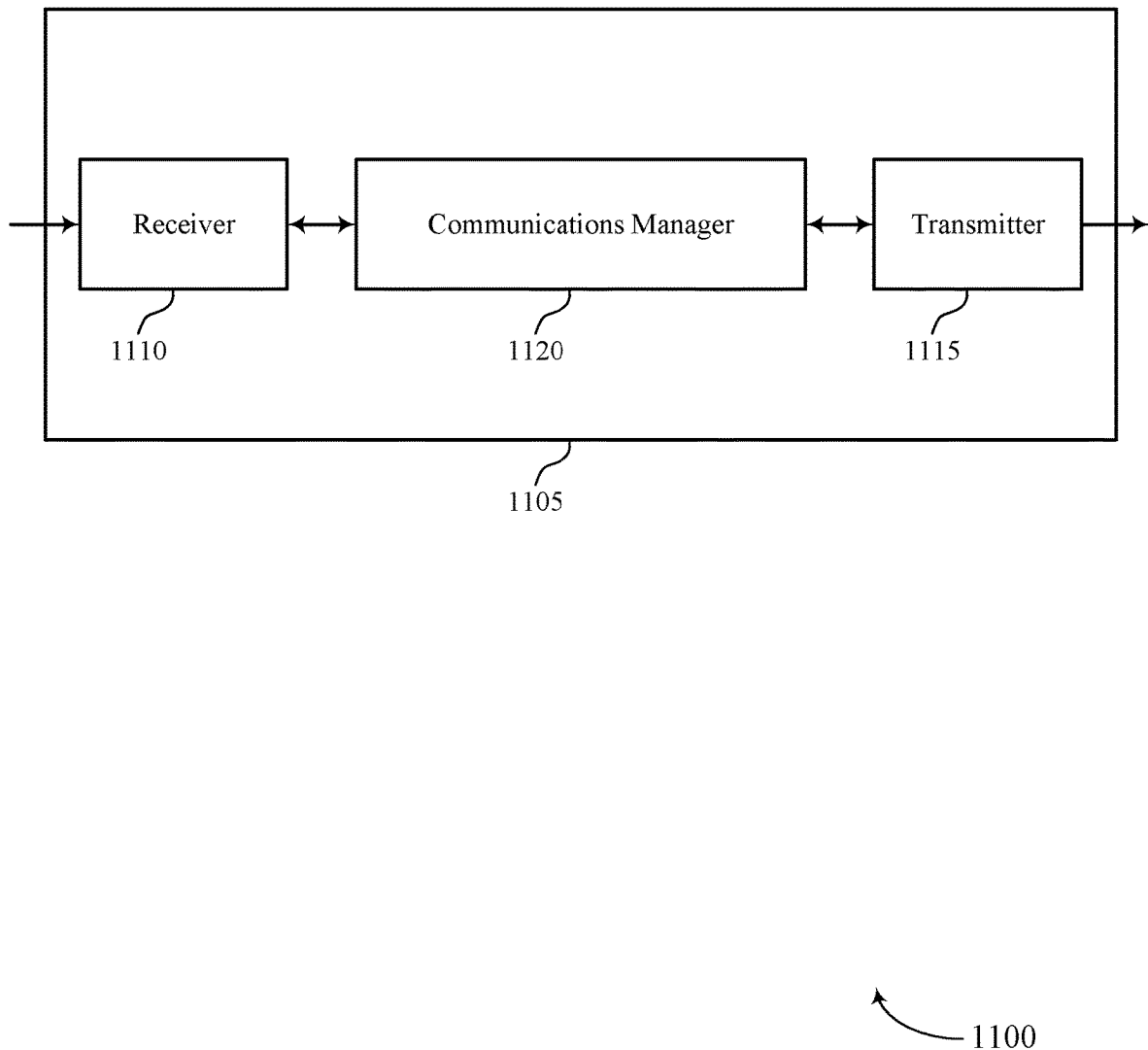
FIGS. 11 and 12 show block diagrams of devices that support adaptation for extended reality transmissions in accordance with one or more aspects of the present disclosure.

FIG. 11 shows a block diagram 1100 of a device 1105 that supports adaptation for extended reality transmissions in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of adaptation for extended reality transmissions as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 may be configured as or otherwise support a means for communicating control signaling indicating a set of multiple transmission configurations for a set of multiple time domain durations within an application data unit and a start of a first time domain duration of the set of multiple time domain durations, the set of multiple transmission configurations indicating a respective number of repetitions for each transmission of a set of multiple transmissions within the application data unit. The communications manager 1120 may be configured as or otherwise support a means for communicating, with a UE during the first time domain duration, a first subset of the set of multiple transmissions within the application data unit in accordance with a first transmission configuration of the set of multiple transmission configurations. The communications manager 1120 may be configured as or otherwise support a means for communicating, with the UE during a second time domain duration of the set of multiple time domain durations, a second subset of the set of multiple transmissions within the application data unit in accordance with a second transmission configuration of the set of multiple transmission configurations.

Additionally, or alternatively, the communications manager 1120 may support wireless communications at a network entity in accordance with examples as disclosed herein. For example, the communications manager 1120 may be configured as or otherwise support a means for transmitting control signaling that separately configures a number of repetitions for each feedback process of a set of multiple feedback processes associated with an application data unit, the control signaling indicating whether repetition is enabled for each feedback process of the set of multiple feedback processes, and indicating a redundancy version identifier sequence for repetitions for each feedback process of the set of multiple feedback processes. The communications manager 1120 may be configured as or otherwise support a means for communicating, with a UE, a set of multiple transmissions within the application data unit in accordance with the control signaling.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for more efficient utilization of communication resources by enabling dynamic configuring of transmissions within an ADU.

Figure 12:
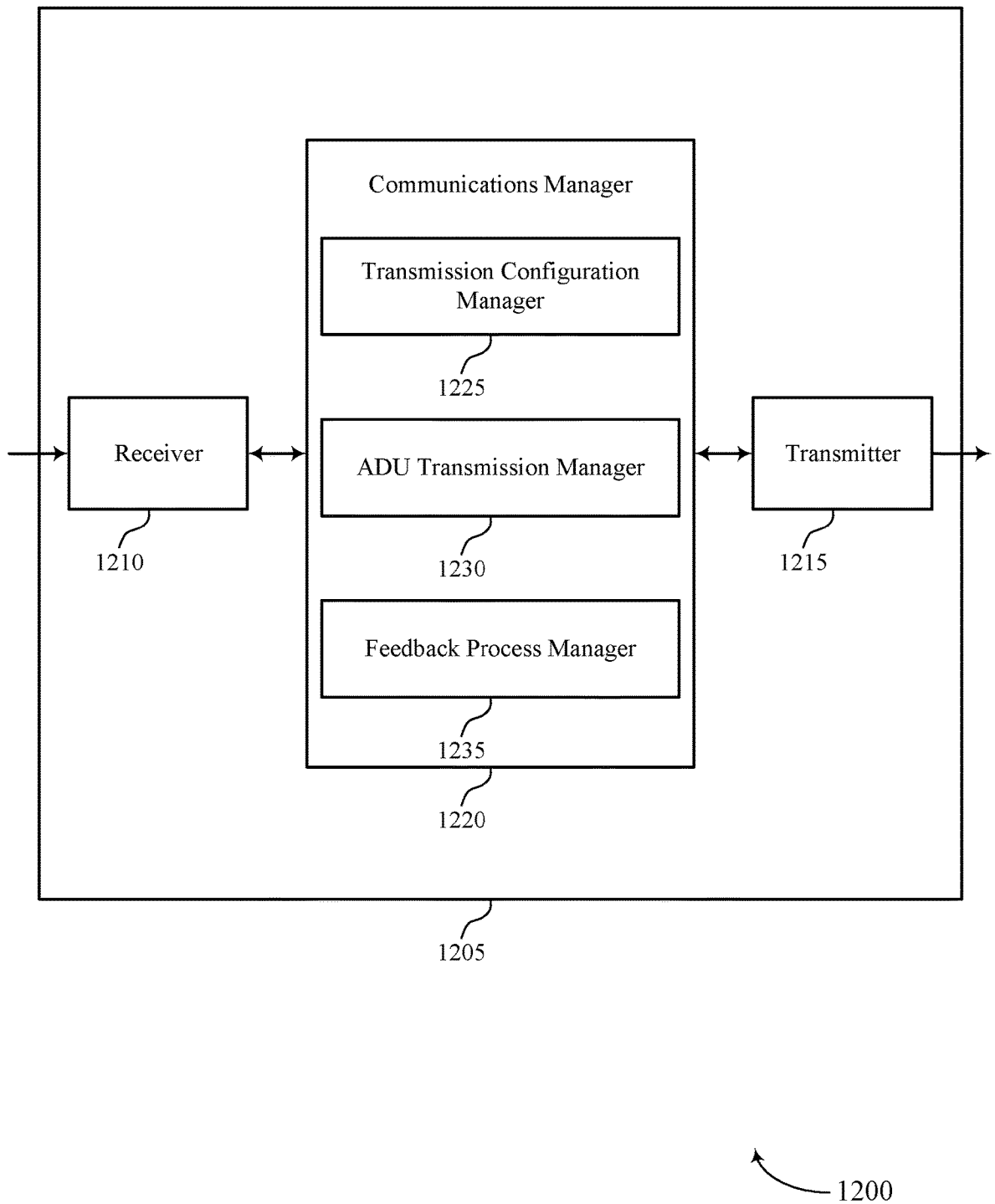

FIG. 12 shows a block diagram 1200 of a device 1205 that supports adaptation for extended reality transmissions in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of adaptation for extended reality transmissions as described herein. For example, the communications manager 1220 may include a transmission configuration manager 1225, an ADU transmission manager 1230, a feedback process manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The transmission configuration manager 1225 may be configured as or otherwise support a means for communicating control signaling indicating a set of multiple transmission configurations for a set of multiple time domain durations within an application data unit and a start of a first time domain duration of the set of multiple time domain durations, the set of multiple transmission configurations indicating a respective number of repetitions for each transmission of a set of multiple transmissions within the application data unit. The ADU transmission manager 1230 may be configured as or otherwise support a means for communicating, with a UE during the first time domain duration, a first subset of the set of multiple transmissions within the application data unit in accordance with a first transmission configuration of the set of multiple transmission configurations. The ADU transmission manager 1230 may be configured as or otherwise support a means for communicating, with the UE during a second time domain duration of the set of multiple time domain durations, a second subset of the set of multiple transmissions within the application data unit in accordance with a second transmission configuration of the set of multiple transmission configurations.

Additionally, or alternatively, the communications manager 1220 may support wireless communications at a network entity in accordance with examples as disclosed herein. The feedback process manager 1235 may be configured as or otherwise support a means for transmitting control signaling that separately configures a number of repetitions for each feedback process of a set of multiple feedback processes associated with an application data unit, the control signaling indicating whether repetition is enabled for each feedback process of the set of multiple feedback processes, and indicating a redundancy version identifier sequence for repetitions for each feedback process of the set of multiple feedback processes. The ADU transmission manager 1230 may be configured as or otherwise support a means for communicating, with a UE, a set of multiple transmissions within the application data unit in accordance with the control signaling.

Figure 13:
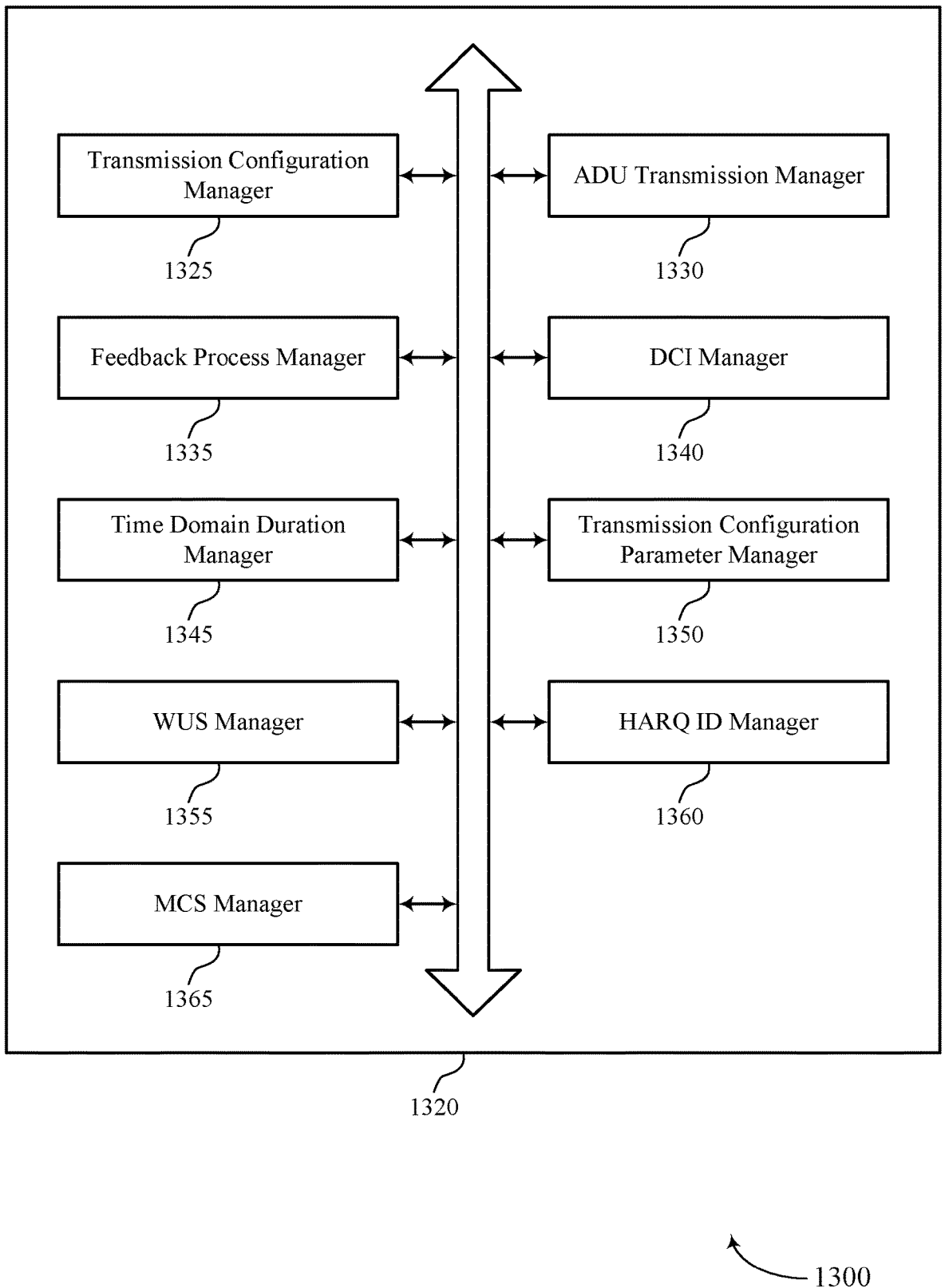
FIG. 13 shows a block diagram of a communications manager that supports adaptation for extended reality transmissions in accordance with one or more aspects of the present disclosure.

FIG. 13 shows a block diagram 1300 of a communications manager 1320 that supports adaptation for extended reality transmissions in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of adaptation for extended reality transmissions as described herein. For example, the communications manager 1320 may include a transmission configuration manager 1325, an ADU transmission manager 1330, a feedback process manager 1335, a DCI manager 1340, a time domain duration manager 1345, a transmission configuration parameter manager 1350, a WUS manager 1355, an HARQ ID manager 1360, an MCS manager 1365, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The transmission configuration manager 1325 may be configured as or otherwise support a means for communicating control signaling indicating a set of multiple transmission configurations for a set of multiple time domain durations within an application data unit and a start of a first time domain duration of the set of multiple time domain durations, the set of multiple transmission configurations indicating a respective number of repetitions for each transmission of a set of multiple transmissions within the application data unit. The ADU transmission manager 1330 may be configured as or otherwise support a means for communicating, with a UE during the first time domain duration, a first subset of the set of multiple transmissions within the application data unit in accordance with a first transmission configuration of the set of multiple transmission configurations. In some examples, the ADU transmission manager 1330 may be configured as or otherwise support a means for communicating, with the UE during a second time domain duration of the set of multiple time domain durations, a second subset of the set of multiple transmissions within the application data unit in accordance with a second transmission configuration of the set of multiple transmission configurations.

In some examples, to support communicating the control signaling, the DCI manager 1340 may be configured as or otherwise support a means for transmitting a DCI message scheduling the set of multiple transmissions within the application data unit.

In some examples, to support communicating the control signaling, the transmission configuration manager 1325 may be configured as or otherwise support a means for communicating a first control message indicating the set of multiple transmission configurations for the set of multiple time domain durations. In some examples, to support communicating the control signaling, the time domain duration manager 1345 may be configured as or otherwise support a means for communicating a second control message indicating the start of the first time domain duration.

In some examples, to support communicating the control signaling, the time domain duration manager 1345 may be configured as or otherwise support a means for communicating a third control message indicating a start of the second time domain duration.

In some examples, to support communicating the control signaling, the transmission configuration parameter manager 1350 may be configured as or otherwise support a means for communicating the control signaling indicating one or more parameters associated with each transmission configuration, the one or more parameters including activation or deactivation of retransmission based on HARQ, an MCS, or both.

In some examples, to support communicating the control signaling, the WUS manager 1355 may be configured as or otherwise support a means for transmitting a wake-up signal, where a timing of the start of the first time domain duration of the set of multiple time domain durations is based on the wake-up signal.

In some examples, to support communicating the control signaling, the time domain duration manager 1345 may be configured as or otherwise support a means for communicating the control signaling indicating a respective timer associated with each time domain duration of the set of multiple time domain durations, where a number of transmissions within each time domain duration of the set of multiple time domain durations is based on the respective timer associated with each time domain duration of the set of multiple time domain durations.

In some examples, to support communicating the control signaling, the time domain duration manager 1345 may be configured as or otherwise support a means for communicating the control signaling indicating a number of slots associated with each time domain duration of the set of multiple time domain durations.

In some examples, to support communicating the control signaling, the HARQ ID manager 1360 may be configured as or otherwise support a means for communicating the control signaling indicating, for each transmission of the set of multiple transmissions, a respective HARQ identifier and one or more parameters associated with the respective transmission, the one or more parameters including a number of repetitions, an MCS value, or both.

In some examples, a first number of transmissions of the first subset of the set of multiple transmissions is less than a second number of transmissions of the second subset of the set of multiple transmissions.

Additionally, or alternatively, the communications manager 1320 may support wireless communications at a network entity in accordance with examples as disclosed herein. The feedback process manager 1335 may be configured as or otherwise support a means for transmitting control signaling that separately configures a number of repetitions for each feedback process of a set of multiple feedback processes associated with an application data unit, the control signaling indicating whether repetition is enabled for each feedback process of the set of multiple feedback processes, and indicating a redundancy version identifier sequence for repetitions for each feedback process of the set of multiple feedback processes. In some examples, the ADU transmission manager 1330 may be configured as or otherwise support a means for communicating, with a UE, a set of multiple transmissions within the application data unit in accordance with the control signaling.

In some examples, a respective transmission of the set of multiple transmissions is associated with a respective feedback process of the set of multiple feedback processes.

In some examples, to support communicating the set of multiple transmissions, the ADU transmission manager 1330 may be configured as or otherwise support a means for communicating a first transmission of the set of multiple transmissions and a repetition of the first transmission within the application data unit in accordance with a respective redundancy version identifier sequence for repetitions associated with a first feedback process of the set of multiple feedback processes indicating that repetition is enabled.

In some examples, to support communicating the set of multiple transmissions, the ADU transmission manager 1330 may be configured as or otherwise support a means for communicating a first transmission of the set of multiple transmissions within the application data unit in accordance with a respective redundancy version identifier sequence for repetitions associated with a first feedback process of the set of multiple feedback processes indicating that repetition is disabled, where a repetition of the first transmission is not transmitted within the application data unit.

In some examples, to support transmitting the control signaling, the feedback process manager 1335 may be configured as or otherwise support a means for transmitting the control signaling via one of a DCI message or a medium access control (MAC) control element.

In some examples, to support transmitting the control signaling, the MCS manager 1365 may be configured as or otherwise support a means for transmitting an indication of a respective MCS associated with each feedback process of the set of multiple feedback processes.

Figure 14:
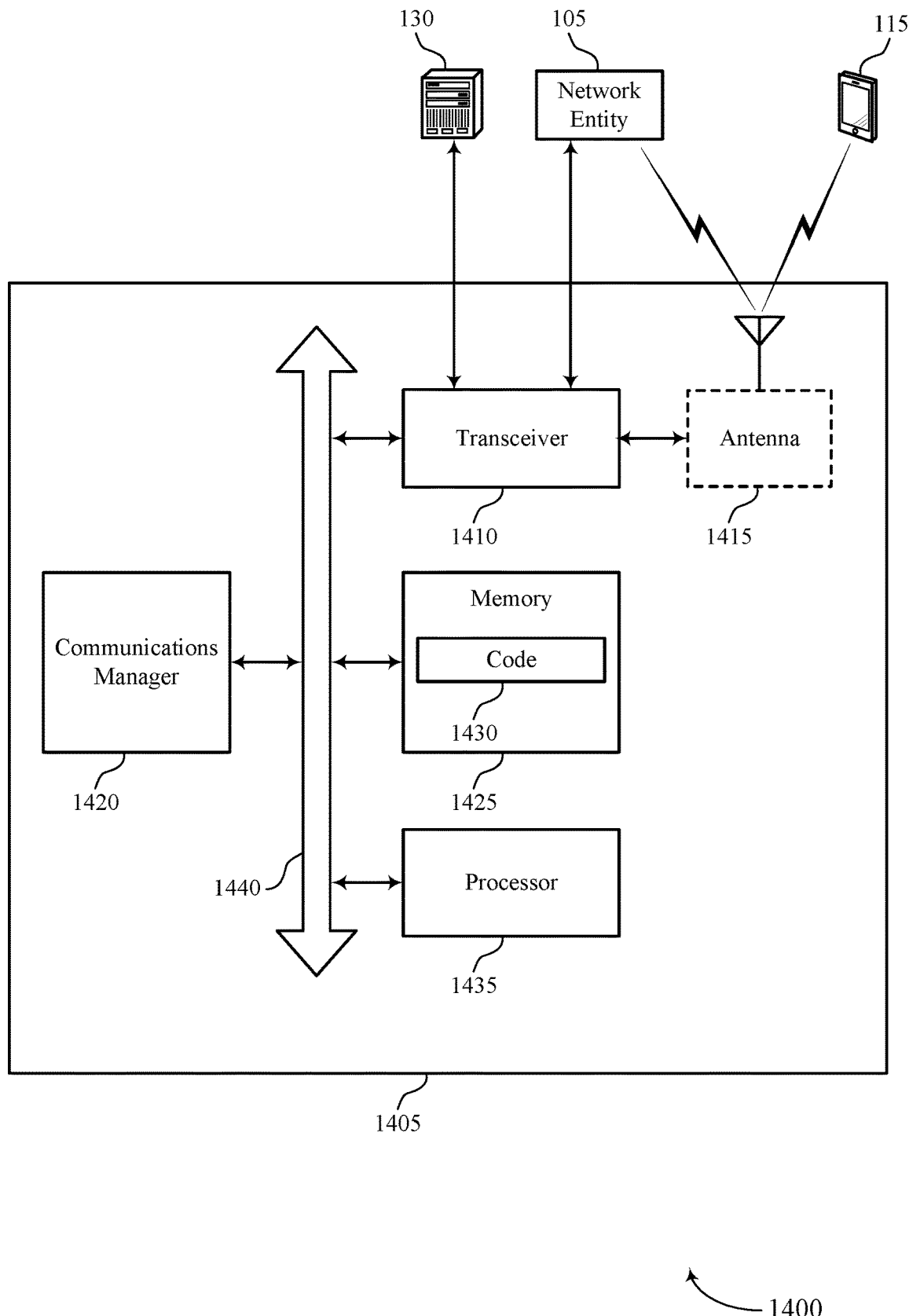
FIG. 14 shows a diagram of a system including a device that supports adaptation for extended reality transmissions in accordance with one or more aspects of the present disclosure.

FIG. 14 shows a diagram of a system 1400 including a device 1405 that supports adaptation for extended reality transmissions in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting adaptation for extended reality transmissions). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 may be configured as or otherwise support a means for communicating control signaling indicating a set of multiple transmission configurations for a set of multiple time domain durations within an application data unit and a start of a first time domain duration of the set of multiple time domain durations, the set of multiple transmission configurations indicating a respective number of repetitions for each transmission of a set of multiple transmissions within the application data unit. The communications manager 1420 may be configured as or otherwise support a means for communicating, with a UE during the first time domain duration, a first subset of the set of multiple transmissions within the application data unit in accordance with a first transmission configuration of the set of multiple transmission configurations. The communications manager 1420 may be configured as or otherwise support a means for communicating, with the UE during a second time domain duration of the set of multiple time domain durations, a second subset of the set of multiple transmissions within the application data unit in accordance with a second transmission configuration of the set of multiple transmission configurations.

Additionally, or alternatively, the communications manager 1420 may support wireless communications at a network entity in accordance with examples as disclosed herein. For example, the communications manager 1420 may be configured as or otherwise support a means for transmitting control signaling that separately configures a number of repetitions for each feedback process of a set of multiple feedback processes associated with an application data unit, the control signaling indicating whether repetition is enabled for each feedback process of the set of multiple feedback processes, and indicating a redundancy version identifier sequence for repetitions for each feedback process of the set of multiple feedback processes. The communications manager 1420 may be configured as or otherwise support a means for communicating, with a UE, a set of multiple transmissions within the application data unit in accordance with the control signaling.

By including or configuring the communications manager 1420 in accordance with examples as described herein, the device 1405 may support techniques for improved communication reliability, reduced latency, more efficient utilization of communication resources, improved coordination between devices, and improved utilization of processing capability by enabling dynamic configuring of transmissions within an ADU.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of adaptation for extended reality transmissions as described herein, or the processor 1435 and the memory 1425 may be otherwise configured to perform or support such operations.

Figure 15:
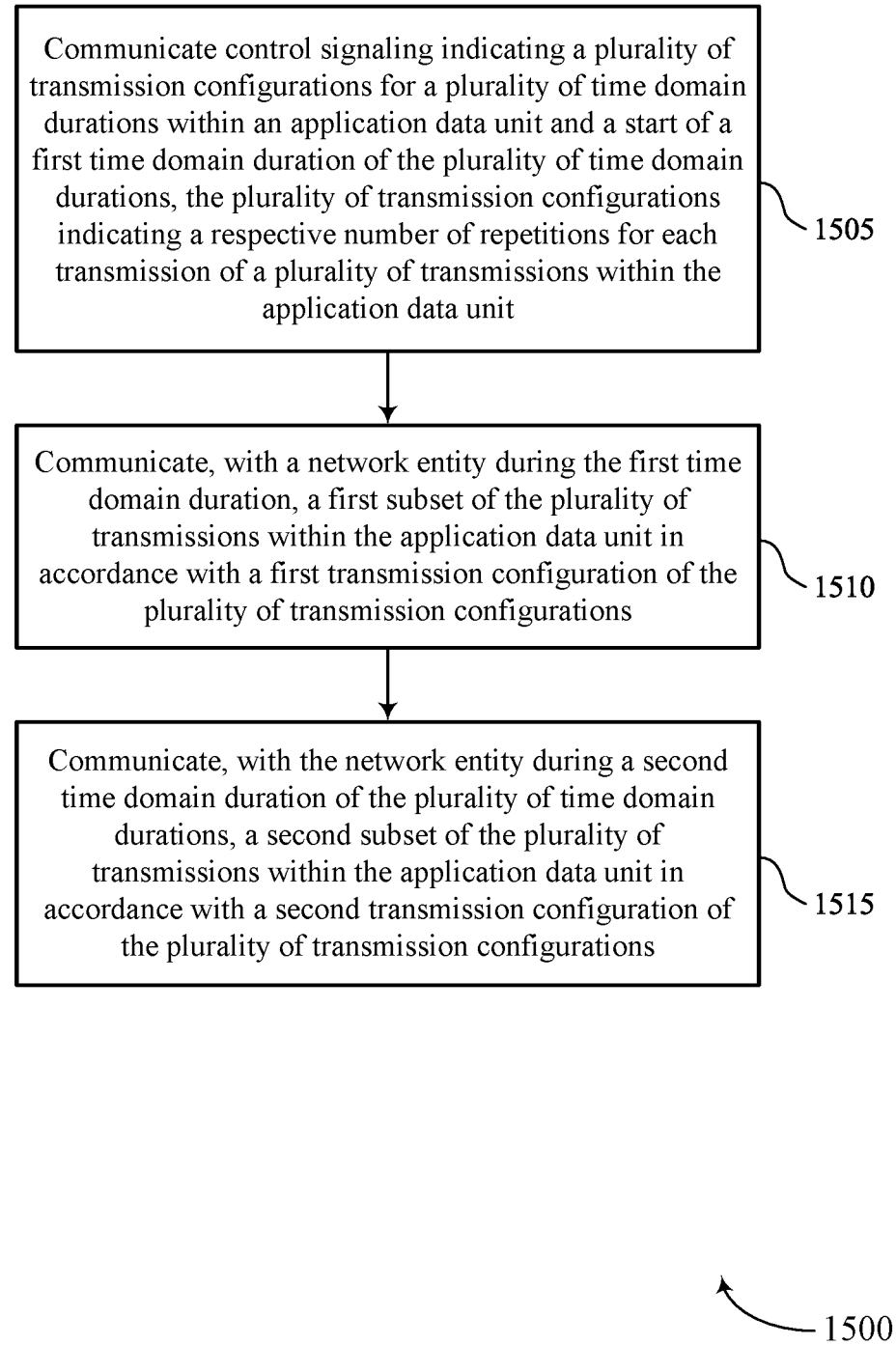
FIGS. 15 through 20 show flowcharts illustrating methods that support adaptation for extended reality transmissions in accordance with one or more aspects of the present disclosure.

FIG. 15 shows a flowchart illustrating a method 1500 that supports adaptation for extended reality transmissions in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include communicating control signaling indicating a set of multiple transmission configurations for a set of multiple time domain durations within an application data unit and a start of a first time domain duration of the set of multiple time domain durations, the set of multiple transmission configurations indicating a respective number of repetitions for each transmission of a set of multiple transmissions within the application data unit. The operations of 1505 may be performed in accordance with examples as disclosed herein. In some examples, aspects of the operations of 1505 may be performed by a transmission configuration manager 925 as described with reference to FIG. 9.

At 1510, the method may include communicating, with a network entity during the first time domain duration, a first subset of the set of multiple transmissions within the application data unit in accordance with a first transmission configuration of the set of multiple transmission configurations. The operations of 1510 may be performed in accordance with examples as disclosed herein. In some examples, aspects of the operations of 1510 may be performed by an ADU transmission manager 930 as described with reference to FIG. 9.

At 1515, the method may include communicating, with the network entity during a second time domain duration of the set of multiple time domain durations, a second subset of the set of multiple transmissions within the application data unit in accordance with a second transmission configuration of the set of multiple transmission configurations. The operations of 1515 may be performed in accordance with examples as disclosed herein. In some examples, aspects of the operations of 1515 may be performed by an ADU transmission manager 930 as described with reference to FIG. 9.

Figure 16:
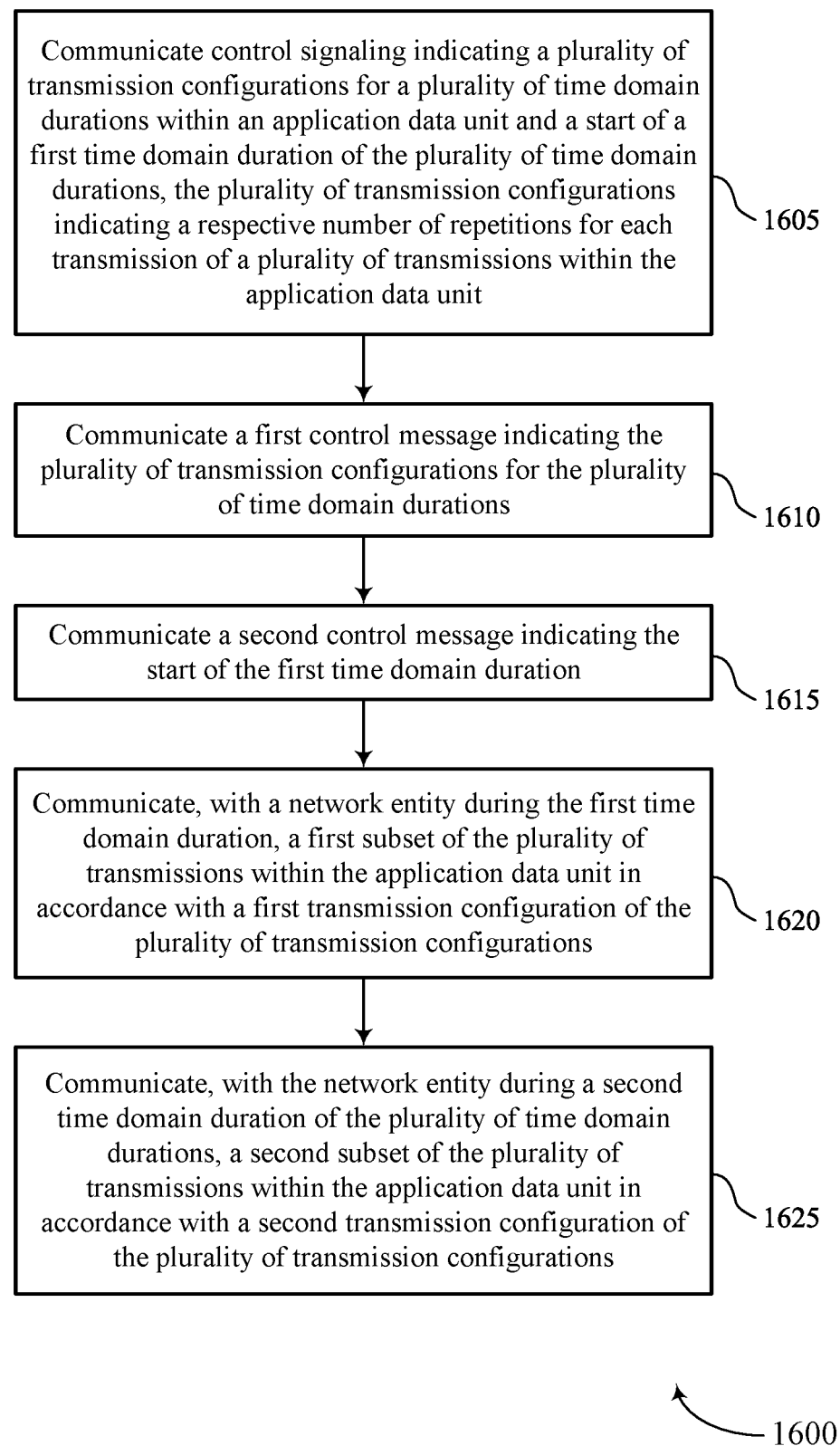

FIG. 16 shows a flowchart illustrating a method 1600 that supports adaptation for extended reality transmissions in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include communicating control signaling indicating a set of multiple transmission configurations for a set of multiple time domain durations within an application data unit and a start of a first time domain duration of the set of multiple time domain durations, the set of multiple transmission configurations indicating a respective number of repetitions for each transmission of a set of multiple transmissions within the application data unit. The operations of 1605 may be performed in accordance with examples as disclosed herein. In some examples, aspects of the operations of 1605 may be performed by a transmission configuration manager 925 as described with reference to FIG. 9.

At 1610, the method may include communicating a first control message indicating the set of multiple transmission configurations for the set of multiple time domain durations. The operations of 1610 may be performed in accordance with examples as disclosed herein. In some examples, aspects of the operations of 1610 may be performed by a transmission configuration manager 925 as described with reference to FIG. 9.

At 1615, the method may include communicating a second control message indicating the start of the first time domain duration. The operations of 1615 may be performed in accordance with examples as disclosed herein. In some examples, aspects of the operations of 1615 may be performed by a time domain duration manager 945 as described with reference to FIG. 9.

At 1620, the method may include communicating, with a network entity during the first time domain duration, a first subset of the set of multiple transmissions within the application data unit in accordance with a first transmission configuration of the set of multiple transmission configurations. The operations of 1620 may be performed in accordance with examples as disclosed herein. In some examples, aspects of the operations of 1620 may be performed by an ADU transmission manager 930 as described with reference to FIG. 9.

At 1625, the method may include communicating, with the network entity during a second time domain duration of the set of multiple time domain durations, a second subset of the set of multiple transmissions within the application data unit in accordance with a second transmission configuration of the set of multiple transmission configurations. The operations of 1625 may be performed in accordance with examples as disclosed herein. In some examples, aspects of the operations of 1625 may be performed by an ADU transmission manager 930 as described with reference to FIG. 9.

Figure 17:
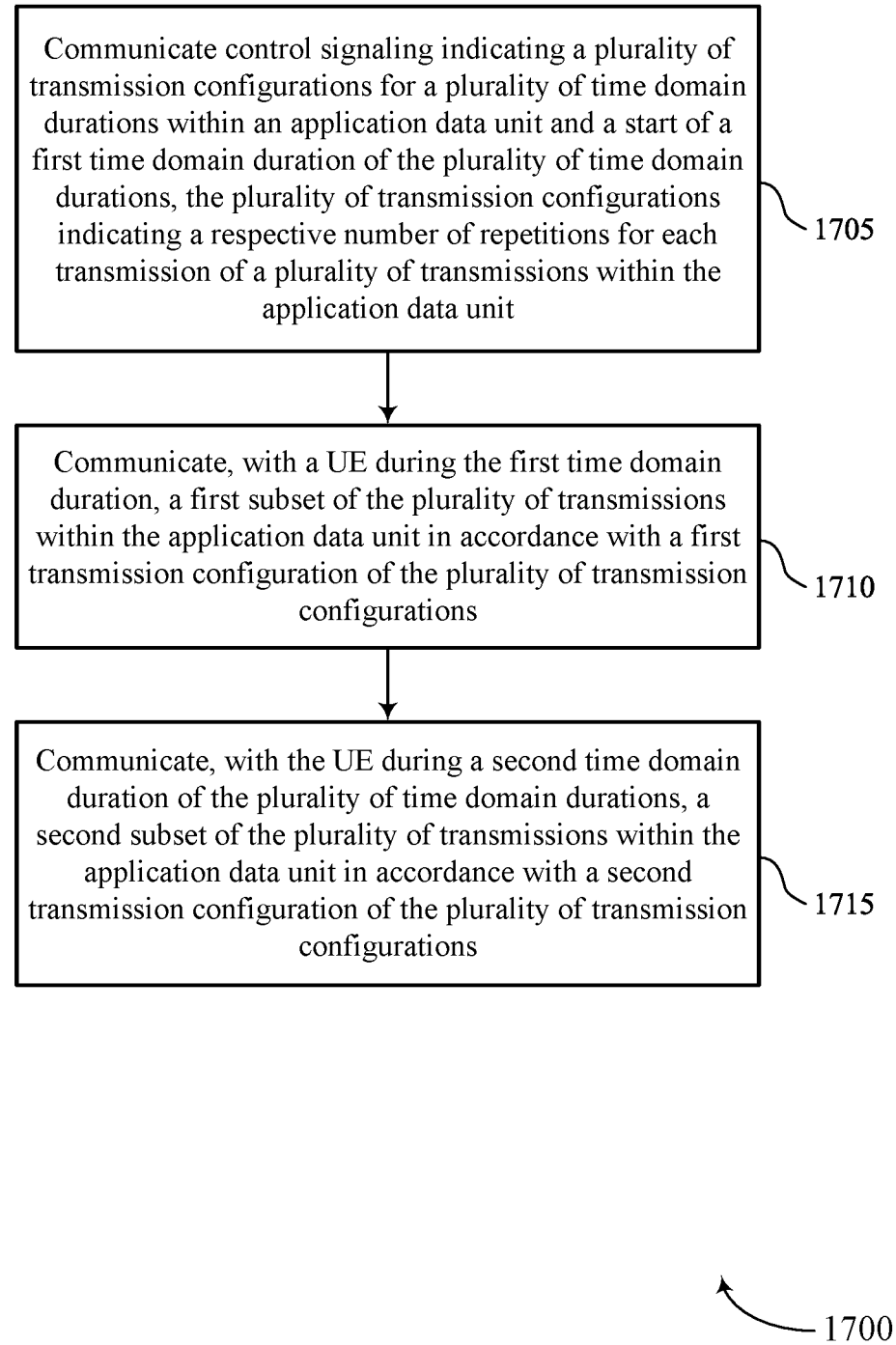

FIG. 17 shows a flowchart illustrating a method 1700 that supports adaptation for extended reality transmissions in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include communicating control signaling indicating a set of multiple transmission configurations for a set of multiple time domain durations within an application data unit and a start of a first time domain duration of the set of multiple time domain durations, the set of multiple transmission configurations indicating a respective number of repetitions for each transmission of a set of multiple transmissions within the application data unit. The operations of 1705 may be performed in accordance with examples as disclosed herein. In some examples, aspects of the operations of 1705 may be performed by a transmission configuration manager 1325 as described with reference to FIG. 13.

At 1710, the method may include communicating, with a UE during the first time domain duration, a first subset of the set of multiple transmissions within the application data unit in accordance with a first transmission configuration of the set of multiple transmission configurations. The operations of 1710 may be performed in accordance with examples as disclosed herein. In some examples, aspects of the operations of 1710 may be performed by an ADU transmission manager 1330 as described with reference to FIG. 13.

At 1715, the method may include communicating, with the UE during a second time domain duration of the set of multiple time domain durations, a second subset of the set of multiple transmissions within the application data unit in accordance with a second transmission configuration of the set of multiple transmission configurations. The operations of 1715 may be performed in accordance with examples as disclosed herein. In some examples, aspects of the operations of 1715 may be performed by an ADU transmission manager 1330 as described with reference to FIG. 13.

Figure 18:
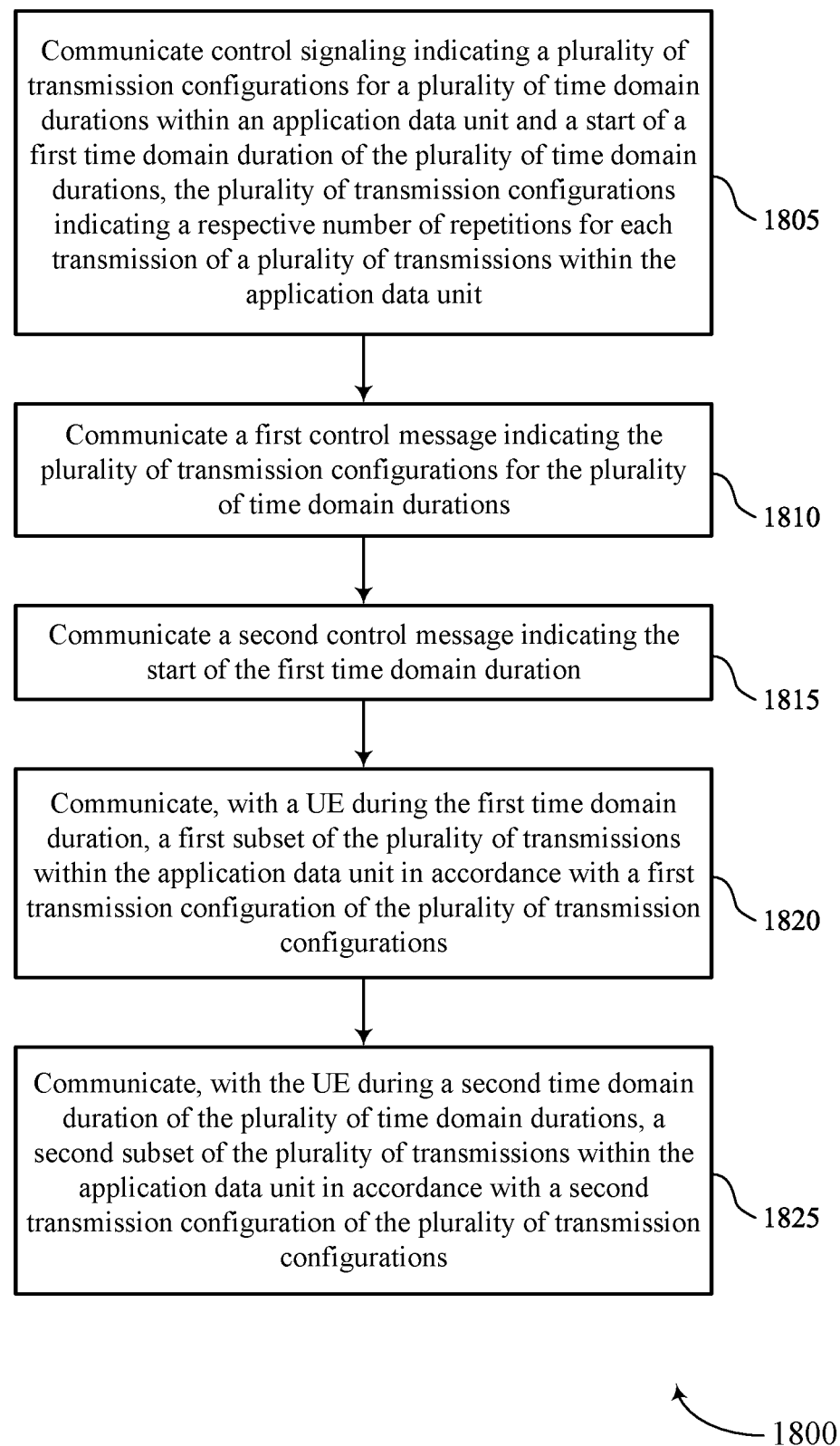

FIG. 18 shows a flowchart illustrating a method 1800 that supports adaptation for extended reality transmissions in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include communicating control signaling indicating a set of multiple transmission configurations for a set of multiple time domain durations within an application data unit and a start of a first time domain duration of the set of multiple time domain durations, the set of multiple transmission configurations indicating a respective number of repetitions for each transmission of a set of multiple transmissions within the application data unit. The operations of 1805 may be performed in accordance with examples as disclosed herein. In some examples, aspects of the operations of 1805 may be performed by a transmission configuration manager 1325 as described with reference to FIG. 13.

At 1810, the method may include communicating a first control message indicating the set of multiple transmission configurations for the set of multiple time domain durations. The operations of 1810 may be performed in accordance with examples as disclosed herein. In some examples, aspects of the operations of 1810 may be performed by a transmission configuration manager 1325 as described with reference to FIG. 13.

At 1815, the method may include communicating a second control message indicating the start of the first time domain duration. The operations of 1815 may be performed in accordance with examples as disclosed herein. In some examples, aspects of the operations of 1815 may be performed by a time domain duration manager 1345 as described with reference to FIG. 13.

At 1820, the method may include communicating, with a UE during the first time domain duration, a first subset of the set of multiple transmissions within the application data unit in accordance with a first transmission configuration of the set of multiple transmission configurations. The operations of 1820 may be performed in accordance with examples as disclosed herein. In some examples, aspects of the operations of 1820 may be performed by an ADU transmission manager 1330 as described with reference to FIG. 13.

At 1825, the method may include communicating, with the UE during a second time domain duration of the set of multiple time domain durations, a second subset of the set of multiple transmissions within the application data unit in accordance with a second transmission configuration of the set of multiple transmission configurations. The operations of 1825 may be performed in accordance with examples as disclosed herein. In some examples, aspects of the operations of 1825 may be performed by an ADU transmission manager 1330 as described with reference to FIG. 13.

Figure 19:
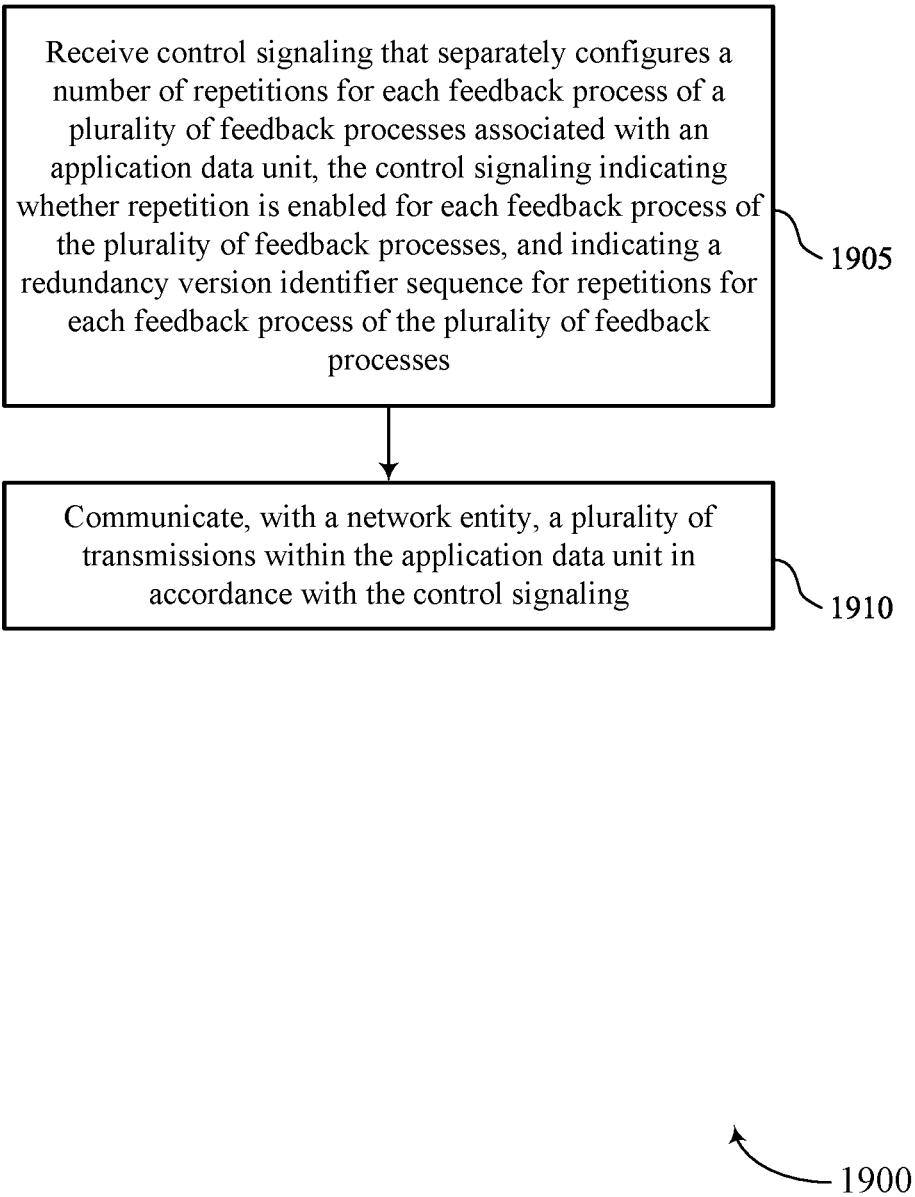

FIG. 19 shows a flowchart illustrating a method 1900 that supports adaptation for extended reality transmissions in accordance with one or more aspects of the present disclosure. The operations of the method 1900 may be implemented by a UE or its components as described herein. For example, the operations of the method 1900 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1905, the method may include receiving control signaling that separately configures a number of repetitions for each feedback process of a set of multiple feedback processes associated with an application data unit, the control signaling indicating whether repetition is enabled for each feedback process of the set of multiple feedback processes, and indicating a redundancy version identifier sequence for repetitions for each feedback process of the set of multiple feedback processes. The operations of 1905 may be performed in accordance with examples as disclosed herein. In some examples, aspects of the operations of 1905 may be performed by a feedback process manager 935 as described with reference to FIG. 9.

At 1910, the method may include communicating, with a network entity, a set of multiple transmissions within the application data unit in accordance with the control signaling. The operations of 1910 may be performed in accordance with examples as disclosed herein. In some examples, aspects of the operations of 1910 may be performed by an ADU transmission manager 930 as described with reference to FIG. 9.

Figure 20:
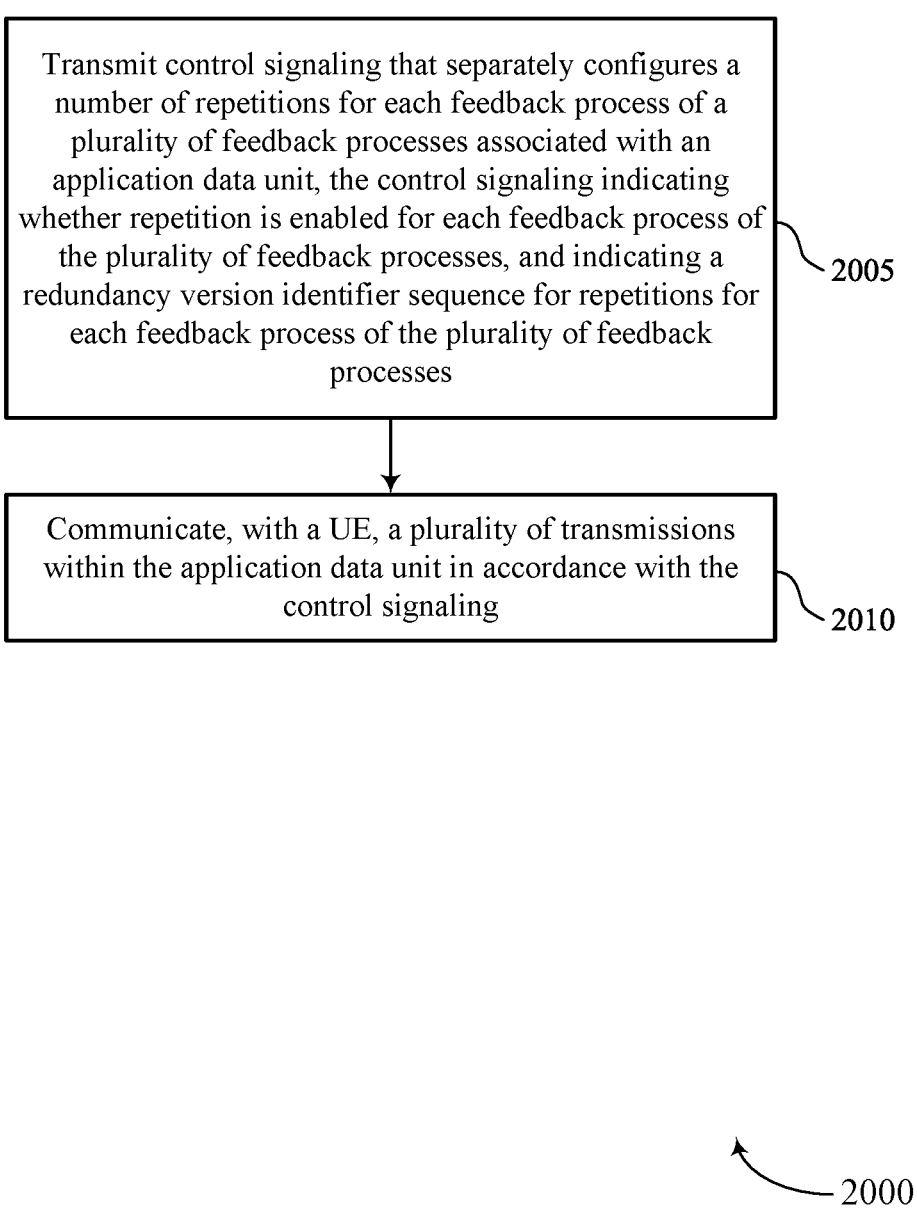

FIG. 20 shows a flowchart illustrating a method 2000 that supports adaptation for extended reality transmissions in accordance with one or more aspects of the present disclosure. The operations of the method 2000 may be implemented by a network entity or its components as described herein. For example, the operations of the method 2000 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2005, the method may include transmitting control signaling that separately configures a number of repetitions for each feedback process of a set of multiple feedback processes associated with an application data unit, the control signaling indicating whether repetition is enabled for each feedback process of the set of multiple feedback processes, and indicating a redundancy version identifier sequence for repetitions for each feedback process of the set of multiple feedback processes. The operations of 2005 may be performed in accordance with examples as disclosed herein. In some examples, aspects of the operations of 2005 may be performed by a feedback process manager 1335 as described with reference to FIG. 13.

At 2010, the method may include communicating, with a UE, a set of multiple transmissions within the application data unit in accordance with the control signaling. The operations of 2010 may be performed in accordance with examples as disclosed herein. In some examples, aspects of the operations of 2010 may be performed by an ADU transmission manager 1330 as described with reference to FIG. 13.

The following provides an overview of aspects of the present disclosure:

Aspect 1: A method for wireless communications at a UE, comprising: communicating control signaling indicating a plurality of transmission configurations for a plurality of time domain durations within an ADU and a start of a first time domain duration of the plurality of time domain durations, the plurality of transmission configurations indicating a respective number of repetitions for each transmission of a plurality of transmissions within the ADU; communicating, with a network entity during the first time domain duration, a first subset of the plurality of transmissions within the ADU in accordance with a first transmission configuration of the plurality of transmission configurations; and communicating, with the network entity during a second time domain duration of the plurality of time domain durations, a second subset of the plurality of transmissions within the ADU in accordance with a second transmission configuration of the plurality of transmission configurations.

Aspect 2: The method of aspect 1, wherein communicating the control signaling comprises: receiving a DCI message scheduling the plurality of transmissions within the ADU.

Aspect 3: The method of any of aspects 1 through 2, wherein communicating the control signaling comprises: communicating a first control message indicating the plurality of transmission configurations for the plurality of time domain durations; and communicating a second control message indicating the start of the first time domain duration.

Aspect 4: The method of aspect 3, wherein communicating the control signaling comprises: communicating a third control message indicating a start of the second time domain duration.

Aspect 5: The method of any of aspects 1 through 4, wherein communicating the control signaling comprises: communicating the control signaling indicating one or more parameters associated with each transmission configuration, the one or more parameters comprising activation or deactivation of retransmission based on HARQ, an MCS, or both.

Aspect 6: The method of any of aspects 1 through 5, wherein communicating the control signaling comprises: receiving a wake-up signal, wherein a timing of the start of the first time domain duration of the plurality of time domain durations is based at least in part on the wake-up signal.

Aspect 7: The method of any of aspects 1 through 6, wherein communicating the control signaling comprises: communicating the control signaling indicating a respective timer associated with each time domain duration of the plurality of time domain durations, wherein a number of transmissions within each time domain duration of the plurality of time domain durations is based at least in part on the respective timer associated with each time domain duration of the plurality of time domain durations.

Aspect 8: The method of any of aspects 1 through 7, wherein communicating the control signaling comprises: communicating the control signaling indicating a number of slots associated with each time domain duration of the plurality of time domain durations.

Aspect 9: The method of any of aspects 1 through 8, wherein the UE does not expect a second transmission of the plurality of transmissions within the ADU with repetition activated prior to a first transmission of the plurality of transmissions within the ADU with repetition deactivated.

Aspect 10: The method of any of aspects 1 through 9, wherein the UE does not expect a second transmission of the plurality of transmissions within the ADU with hybrid automatic repeat request deactivated prior to a first transmission of the plurality of transmissions within the ADU with hybrid automatic repeat request activated.

Aspect 11: The method of any of aspects 1 through 10, wherein the UE does not expect a second transmission of the plurality of transmissions within the ADU with a first MCS prior to a first transmission of the plurality of transmissions within the ADU with a second MCS higher than the first MCS.

Aspect 12: The method of any of aspects 1 through 11, wherein communicating the control signaling comprises: communicating the control signaling indicating, for each transmission of the plurality of transmissions, a respective hybrid automatic repeat request identifier and one or more parameters associated with the respective transmission, the one or more parameters comprising a number of repetitions, an MCS value, or both.

Aspect 13: The method of any of aspects 1 through 12, wherein a first number of transmissions of the first subset of the plurality of transmissions is less than a second number of transmissions of the second subset of the plurality of transmissions.

Aspect 14: A method for wireless communications at a network entity, comprising: communicating control signaling indicating a plurality of transmission configurations for a plurality of time domain durations within an ADU and a start of a first time domain duration of the plurality of time domain durations, the plurality of transmission configurations indicating a respective number of repetitions for each transmission of a plurality of transmissions within the ADU; communicating, with a UE during the first time domain duration, a first subset of the plurality of transmissions within the ADU in accordance with a first transmission configuration of the plurality of transmission configurations; and communicating, with the UE during a second time domain duration of the plurality of time domain durations, a second subset of the plurality of transmissions within the ADU in accordance with a second transmission configuration of the plurality of transmission configurations.

Aspect 15: The method of aspect 14, wherein communicating the control signaling comprises: transmitting a DCI message scheduling the plurality of transmissions within the ADU.

Aspect 16: The method of any of aspects 14 through 15, wherein communicating the control signaling comprises: communicating a first control message indicating the plurality of transmission configurations for the plurality of time domain durations; and communicating a second control message indicating the start of the first time domain duration.

Aspect 17: The method of aspect 16, wherein communicating the control signaling comprises: communicating a third control message indicating a start of the second time domain duration.

Aspect 18: The method of any of aspects 14 through 17, wherein communicating the control signaling comprises: communicating the control signaling indicating one or more parameters associated with each transmission configuration, the one or more parameters comprising activation or deactivation of retransmission based on hybrid automatic repeat request, an MCS, or both.

Aspect 19: The method of any of aspects 14 through 18, wherein communicating the control signaling comprises: transmitting a wake-up signal, wherein a timing of the start of the first time domain duration of the plurality of time domain durations is based at least in part on the wake-up signal.

Aspect 20: The method of any of aspects 14 through 19, wherein communicating the control signaling comprises: communicating the control signaling indicating a respective timer associated with each time domain duration of the plurality of time domain durations, wherein a number of transmissions within each time domain duration of the plurality of time domain durations is based at least in part on the respective timer associated with each time domain duration of the plurality of time domain durations.

Aspect 21: The method of any of aspects 14 through 20, wherein communicating the control signaling comprises: communicating the control signaling indicating a number of slots associated with each time domain duration of the plurality of time domain durations.

Aspect 22: The method of any of aspects 14 through 21, wherein communicating the control signaling comprises: communicating the control signaling indicating, for each transmission of the plurality of transmissions, a respective hybrid automatic repeat request identifier and one or more parameters associated with the respective transmission, the one or more parameters comprising a number of repetitions, an MCS value, or both.

Aspect 23: The method of any of aspects 14 through 22, wherein a first number of transmissions of the first subset of the plurality of transmissions is less than a second number of transmissions of the second subset of the plurality of transmissions.

Aspect 24: A method for wireless communications at a UE, comprising: receiving control signaling that separately configures a number of repetitions for each feedback process of a plurality of feedback processes associated with an ADU, the control signaling indicating whether repetition is enabled for each feedback process of the plurality of feedback processes, and indicating a redundancy version identifier sequence for repetitions for each feedback process of the plurality of feedback processes; and communicating, with a network entity, a plurality of transmissions within the ADU in accordance with the control signaling.

Aspect 25: The method of aspect 24, wherein a respective transmission of the plurality of transmissions is associated with a respective feedback process of the plurality of feedback processes.

Aspect 26: The method of any of aspects 24 through 25, wherein communicating the plurality of transmissions further comprises: communicating a first transmission of the plurality of transmissions and a repetition of the first transmission within the ADU in accordance with a respective redundancy version identifier sequence for repetitions associated with a first feedback process of the plurality of feedback processes indicating that repetition is enabled.

Aspect 27: The method of any of aspects 24 through 26, wherein communicating the plurality of transmissions further comprises: communicating a first transmission of the plurality of transmissions within the ADU in accordance with a respective redundancy version identifier sequence for repetitions associated with a first feedback process of the plurality of feedback processes indicating that repetition is disabled, wherein a repetition of the first transmission is not transmitted within the ADU.

Aspect 28: The method of any of aspects 24 through 27, wherein receiving the control signaling comprises: receiving the control signaling via one of a DCI message or a medium access control (MAC) control element.

Aspect 29: The method of any of aspects 24 through 28, wherein receiving the control signaling comprises: receiving an indication of a respective MCS associated with each feedback process of the plurality of feedback processes.

Aspect 30: A method for wireless communications at a network entity, comprising: transmitting control signaling that separately configures a number of repetitions for each feedback process of a plurality of feedback processes associated with an ADU, the control signaling indicating whether repetition is enabled for each feedback process of the plurality of feedback processes, and indicating a redundancy version identifier sequence for repetitions for each feedback process of the plurality of feedback processes; and communicating, with a UE, a plurality of transmissions within the ADU in accordance with the control signaling.

Aspect 31: The method of aspect 30, wherein a respective transmission of the plurality of transmissions is associated with a respective feedback process of the plurality of feedback processes.

Aspect 32: The method of any of aspects 30 through 31, wherein communicating the plurality of transmissions further comprises: communicating a first transmission of the plurality of transmissions and a repetition of the first transmission within the ADU in accordance with a respective redundancy version identifier sequence for repetitions associated with a first feedback process of the plurality of feedback processes indicating that repetition is enabled.

Aspect 33: The method of any of aspects 30 through 32, wherein communicating the plurality of transmissions further comprises: communicating a first transmission of the plurality of transmissions within the ADU in accordance with a respective redundancy version identifier sequence for repetitions associated with a first feedback process of the plurality of feedback processes indicating that repetition is disabled, wherein a repetition of the first transmission is not transmitted within the ADU.

Aspect 34: The method of any of aspects 30 through 33, wherein transmitting the control signaling comprises: transmitting the control signaling via one of a DCI message or a medium access control (MAC) control element.

Aspect 35: The method of any of aspects 30 through 34, wherein transmitting the control signaling comprises: transmitting an indication of a respective MCS associated with each feedback process of the plurality of feedback processes.

Aspect 36: An apparatus for wireless communications at a UE, comprising a processor; memory coupled with the processor; and instructions stored in the memory and executable by the processor to cause the apparatus to perform a method of any of aspects 1 through 13.

Aspect 37: An apparatus for wireless communications at a UE, comprising at least one means for performing a method of any of aspects 1 through 13.

Aspect 38: A non-transitory computer-readable medium storing code for wireless communications at a UE, the code comprising instructions executable by a processor to perform a method of any of aspects 1 through 13.

Aspect 39: An apparatus for wireless communications at a network entity, comprising a processor; memory coupled with the processor; and instructions stored in the memory and executable by the processor to cause the apparatus to perform a method of any of aspects 14 through 23.

Aspect 40: An apparatus for wireless communications at a network entity, comprising at least one means for performing a method of any of aspects 14 through 23.

Aspect 41: A non-transitory computer-readable medium storing code for wireless communications at a network entity, the code comprising instructions executable by a processor to perform a method of any of aspects 14 through 23.

Aspect 42: An apparatus for wireless communications at a UE, comprising a processor; memory coupled with the processor; and instructions stored in the memory and executable by the processor to cause the apparatus to perform a method of any of aspects 24 through 29.

Aspect 43: An apparatus for wireless communications at a UE, comprising at least one means for performing a method of any of aspects 24 through 29.

Aspect 44: A non-transitory computer-readable medium storing code for wireless communications at a UE, the code comprising instructions executable by a processor to perform a method of any of aspects 24 through 29.

Aspect 45: An apparatus for wireless communications at a network entity, comprising a processor; memory coupled with the processor; and instructions stored in the memory and executable by the processor to cause the apparatus to perform a method of any of aspects 30 through 35.

Aspect 46: An apparatus for wireless communications at a network entity, comprising at least one means for performing a method of any of aspects 30 through 35.

Aspect 47: A non-transitory computer-readable medium storing code for wireless communications at a network entity, the code comprising instructions executable by a processor to perform a method of any of aspects 30 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
 communicating control signaling indicating a plurality of transmission configurations for a plurality of time domain durations within an application data unit and a start of a first time domain duration of the plurality of time domain durations, the plurality of transmission configurations indicating a respective number of repetitions for each transmission of a plurality of transmissions within the application data unit;

communicating, with a network entity during the first time domain duration, a first subset of the plurality of transmissions within the application data unit in accordance with a first transmission configuration of the plurality of transmission configurations; and communicating, with the network entity during a second time domain duration of the plurality of time domain durations, a second subset of the plurality of transmissions within the application data unit in accordance with a second transmission configuration of the plurality of transmission configurations.

2. The method of claim 1, wherein communicating the control signaling comprises:
receiving a downlink control information message scheduling the plurality of transmissions within the application data unit.

3. The method of claim 1, wherein communicating the control signaling comprises:
communicating a first control message indicating the plurality of transmission configurations for the plurality of time domain durations; and
communicating a second control message indicating the start of the first time domain duration.

4. The method of claim 3, wherein communicating the control signaling comprises:
communicating a third control message indicating a start of the second time domain duration.

5. The method of claim 1, wherein communicating the control signaling comprises:
communicating the control signaling indicating one or more parameters associated with each transmission configuration, the one or more parameters comprising activation or deactivation of retransmission based on hybrid automatic repeat request, a modulation and coding scheme, or both.

6. The method of claim 1, wherein communicating the control signaling comprises:
receiving a wake-up signal, wherein a timing of the start of the first time domain duration of the plurality of time domain durations is based at least in part on the wake-up signal.

7. The method of claim 1, wherein communicating the control signaling comprises:
communicating the control signaling indicating a respective timer associated with each time domain duration of the plurality of time domain durations, wherein a number of transmissions within each time domain duration of the plurality of time domain durations is based at least in part on the respective timer associated with each time domain duration of the plurality of time domain durations.

8. The method of claim 1, wherein communicating the control signaling comprises:
communicating the control signaling indicating a number of slots associated with each time domain duration of the plurality of time domain durations.

9. The method of claim 1, wherein the UE does not expect a second transmission of the plurality of transmissions within the application data unit with repetition activated prior to a first transmission of the plurality of transmissions within the application data unit with repetition deactivated.

10. The method of claim 1, wherein the UE does not expect a second transmission of the plurality of transmissions within the application data unit with hybrid automatic repeat request deactivated prior to a first transmission of the plurality of transmissions within the application data unit with hybrid automatic repeat request activated.

11. The method of claim 1, wherein the UE does not expect a second transmission of the plurality of transmissions within the application data unit with a first modulation and coding scheme prior to a first transmission of the plurality of transmissions within the application data unit with a second modulation and coding scheme higher than the first modulation and coding scheme.

12. The method of claim 1, wherein communicating the control signaling comprises:
communicating the control signaling indicating, for each transmission of the plurality of transmissions, a respective hybrid automatic repeat request identifier and one or more respective parameters, the one or more respective parameters comprising a number of repetitions, a modulation and coding scheme value, or both.

13. The method of claim 1, wherein a first number of transmissions of the first subset of the plurality of transmissions is less than a second number of transmissions of the second subset of the plurality of transmissions.

14. A method for wireless communications at a network entity, comprising:
communicating control signaling indicating a plurality of transmission configurations for a plurality of time domain durations within an application data unit and a start of a first time domain duration of the plurality of time domain durations, the plurality of transmission configurations indicating a respective number of repetitions for each transmission of a plurality of transmissions within the application data unit;
communicating, with a user equipment (UE) during the first time domain duration, a first subset of the plurality of transmissions within the application data unit in accordance with a first transmission configuration of the plurality of transmission configurations; and
communicating, with the UE during a second time domain duration of the plurality of time domain durations, a second subset of the plurality of transmissions within the application data unit in accordance with a second transmission configuration of the plurality of transmission configurations.

15. The method of claim 14, wherein communicating the control signaling comprises:
transmitting a downlink control information message scheduling the plurality of transmissions within the application data unit.

16. The method of claim 14, wherein communicating the control signaling comprises:
communicating a first control message indicating the plurality of transmission configurations for the plurality of time domain durations; and
communicating a second control message indicating the start of the first time domain duration.

17. The method of claim 16, wherein communicating the control signaling comprises:
communicating a third control message indicating a start of the second time domain duration.

18. The method of claim 14, wherein communicating the control signaling comprises:
communicating the control signaling indicating one or more parameters associated with each transmission configuration, the one or more parameters comprising activation or deactivation of retransmission based on hybrid automatic repeat request, a modulation and coding scheme, or both.

19. The method of claim 14, wherein communicating the control signaling comprises:
transmitting a wake-up signal, wherein a timing of the start of the first time domain duration of the plurality of time domain durations is based at least in part on the wake-up signal.

20. The method of claim 14, wherein communicating the control signaling comprises:
communicating the control signaling indicating a respective timer associated with each time domain duration of the plurality of time domain durations, wherein a number of transmissions within each time domain duration of the plurality of time domain durations is based at least in part on the respective timer associated with each time domain duration of the plurality of time domain durations.

21. The method of claim 14, wherein communicating the control signaling comprises:
communicating the control signaling indicating a number of slots associated with each time domain duration of the plurality of time domain durations.

22. The method of claim 14, wherein communicating the control signaling comprises:
communicating the control signaling indicating, for each transmission of the plurality of transmissions, a respective hybrid automatic repeat request identifier and one or more respective parameters, the one or more respective parameters comprising a number of repetitions, a modulation and coding scheme value, or both.

23. The method of claim 14, wherein a first number of transmissions of the first subset of the plurality of transmissions is less than a second number of transmissions of the second subset of the plurality of transmissions.

24. An apparatus for wireless communications at a user equipment (UE), comprising:
at least one processor;
memory coupled with the at least one processor; and
instructions stored in the memory and executable by the at least one processor to cause the apparatus to:
communicate control signaling indicating a plurality of transmission configurations for a plurality of time domain durations within an application data unit and a start of a first time domain duration of the plurality of time domain durations, the plurality of transmission configurations indicating a respective number of repetitions for each transmission of a plurality of transmissions within the application data unit;
communicate, with a network entity during the first time domain duration, a first subset of the plurality of transmissions within the application data unit in accordance with a first transmission configuration of the plurality of transmission configurations; and
communicate, with the network entity during a second time domain duration of the plurality of time domain durations, a second subset of the plurality of transmissions within the application data unit in accordance with a second transmission configuration of the plurality of transmission configurations.

25. The apparatus of claim 24, wherein the instructions are further executable to communicate the control signaling by being executable by the at least one processor to:
receive a downlink control information message scheduling the plurality of transmissions within the application data unit.

26. The apparatus of claim 24, wherein the instructions are further executable to communicate the control signaling by being executable by the at least one processor to:
communicate a first control message indicating the plurality of transmission configurations for the plurality of time domain durations; and
communicate a second control message indicating the start of the first time domain duration.

27. The apparatus of claim 26, wherein the instructions are further executable to communicate the control signaling by being executable by the at least one processor to:
communicate a third control message indicating a start of the second time domain duration.

28. The apparatus of claim 24, wherein the instructions are further executable to communicate the control signaling by being executable by the at least one processor to:
communicate the control signaling indicating one or more parameters associated with each transmission configuration, the one or more parameters comprising activation or deactivation of retransmission based on hybrid automatic repeat request, a modulation and coding scheme, or both.

29. The apparatus of claim 24, wherein the instructions are further executable to communicate the control signaling by being executable by the at least one processor to:
receive a wake-up signal, wherein a timing of the start of the first time domain duration of the plurality of time domain durations is based at least in part on the wake-up signal.

30. An apparatus for wireless communications at a network entity, comprising:
at least one processor;
memory coupled with the at least one processor; and
instructions stored in the memory and executable by the at least one processor to cause the apparatus to:
communicate control signaling indicating a plurality of transmission configurations for a plurality of time domain durations within an application data unit and a start of a first time domain duration of the plurality of time domain durations, the plurality of transmission configurations indicating a respective number of repetitions for each transmission of a plurality of transmissions within the application data unit;
communicate, with a user equipment (UE) during the first time domain duration, a first subset of the plurality of transmissions within the application data unit in accordance with a first transmission configuration of the plurality of transmission configurations; and
communicate, with the UE during a second time domain duration of the plurality of time domain durations, a second subset of the plurality of transmissions within the application data unit in accordance with a second transmission configuration of the plurality of transmission configurations.

* * * * *